United States Patent
Kawahara et al.

(10) Patent No.: US 10,359,102 B2
(45) Date of Patent: Jul. 23, 2019

(54) FRICTION ROLLER-TYPE REDUCTION GEAR

(71) Applicant: NSK LTD., Tokyo (JP)

(72) Inventors: Hiroshi Kawahara, Fujisawa (JP); Hiroyasu Yoshioka, Fujisawa (JP); Tetsu Takehara, Fujisawa (JP); Yuji Shimomura, Fujisawa (JP)

(73) Assignee: NSK LTD., Tokyo (JP)

( * ) Notice: Subject to any disclaimer, the term of this patent is extended or adjusted under 35 U.S.C. 154(b) by 36 days.

(21) Appl. No.: 15/562,315

(22) PCT Filed: Feb. 24, 2016

(86) PCT No.: PCT/JP2016/055533
§ 371 (c)(1),
(2) Date: Sep. 27, 2017

(87) PCT Pub. No.: WO2016/158106
PCT Pub. Date: Oct. 6, 2016

(65) Prior Publication Data
US 2018/0347675 A1  Dec. 6, 2018

(30) Foreign Application Priority Data

Mar. 30, 2015 (JP) ................................. 2015-069846
Apr. 13, 2015 (JP) ................................. 2015-081887
Jun. 9, 2015 (JP) ................................. 2015-116760

(51) Int. Cl.
*F16H 13/04* (2006.01)
*F16H 13/08* (2006.01)
*F16H 13/14* (2006.01)

(52) U.S. Cl.
CPC ............. *F16H 13/08* (2013.01); *F16H 13/04* (2013.01); *F16H 13/14* (2013.01)

(58) Field of Classification Search
CPC .................... F16H 15/00–56; F16H 13/00–14
See application file for complete search history.

(56) References Cited

U.S. PATENT DOCUMENTS 3,283,614 A * 11/1966 Hewko ................... F16H 13/06
475/183
3,641,842 A * 2/1972 Hewko ................... F16H 15/40
475/184

(Continued)

FOREIGN PATENT DOCUMENTS

JP      52-92068 A    8/1977
JP      57-184351 U    11/1982

(Continued)

OTHER PUBLICATIONS

Communication dated Apr. 5, 2018, issued by the European Patent Office in counterpart European application No. 16771990.5.

(Continued)

*Primary Examiner* — Jacob S. Scott
*Assistant Examiner* — Lillian T Nguyen
(74) *Attorney, Agent, or Firm* — Sughrue Mion, PLLC

(57) ABSTRACT

A friction roller-type reduction gear includes a sun roller concentric with an input shaft, a ring roller having a stationary ring roller element and a moveable ring roller element, intermediate rollers in rolling contact with an outer peripheral surface of the sun roller and an inner peripheral surface of the ring roller, a coupling part coupling the ring roller and the output shaft, and a loading cam mechanism having a cam ring for changing contact surface pressure of each rolling contact surface. The outer surface of the sun roller is a concave curved surface of which a shape of an outer edge in an axial cross-section is a single circular arc-shaped concave curve, and an outer surface of the intermediate roller is a convex curved surface of which a (Continued)

shape of an outer edge in an axial cross-section is a single circular arc-shaped convex curve.

5 Claims, 26 Drawing Sheets

(56) References Cited

U.S. PATENT DOCUMENTS

| | | | | |
|---|---|---|---|---|
| 3,682,020 | A | * | 8/1972 | Scheiter ................. F16H 13/06 475/114 |
| 9,482,323 | B2 | * | 11/2016 | Tanaka .................... F16H 13/08 |
| 2004/0023754 | A1 | * | 2/2004 | Flugrad, Jr. ............ F16H 13/02 476/50 |
| 2015/0065287 | A1 | | 3/2015 | Peterson et al. |

FOREIGN PATENT DOCUMENTS

| | | |
|---|---|---|
| JP | 1-229155 A | 9/1989 |
| JP | 7-20446 U | 4/1995 |
| JP | 2004-116670 A | 4/2004 |
| JP | 2008-256054 A | 10/2008 |
| JP | 2013-104545 A | 5/2013 |
| JP | 2013-108572 A | 6/2013 |
| JP | 2014-40885 A | 3/2014 |
| JP | 2014-40892 A | 3/2014 |
| JP | 2014-196825 A | 10/2014 |
| WO | 2013/174740 A1 | 11/2013 |

OTHER PUBLICATIONS

International Search Report dated Mar. 22, 2016 issued by the International Searching Authority in counterpart International Application PCT/JP2016/055533 (PCT/ISA/210).

Written Opinion dated Mar. 22, 2016 issued by the International Searching Authority in counterpart International Application PCT/JP2016/055533 (PCT/ISA/237).

* cited by examiner

FRICTION ROLLER-TYPE REDUCTION GEAR

TECHNICAL FIELD

The present invention relates to a friction roller-type reduction gear.

RELATED ART

In order to improve the convenience of an electric car that has been recently spread, it is strongly needed to improve the efficiency of an electric motor so as to increase a travelable distance per charge cycle. In order to improve the efficiency of the electric motor, preferably, a small electric motor configured to rotate at high speed is used and rotation of a motor output shaft is reduced and is then transmitted to driving wheels of a vehicle. In this case, a reduction gear connected to the motor output shaft is operated at very high speed, so that vibration and noise are likely to be generated. Therefore, in order to suppress the vibration and noise upon the operation, it is considered to use a friction roller-type reduction gear. For example, Patent Documents 1 and 2 disclose a friction roller-type reduction gear.

As shown in FIG. 26, a friction roller-type reduction gear 500 disclosed in Patent Document 1 includes a sun roller 511 connected to an input shaft, an output shaft 512 having a holding cylinder 513 at one end, a ring roller 515 having a pair of ring roller elements 514A, 514B, a plurality of intermediate rollers 516 arranged in an annular space between an inner peripheral surface of the ring roller 515 and an outer peripheral surface of the sun roller 511, and a surface pressure applying device 517 arranged on a side surface of the ring roller element 514A.

The outer peripheral surface of the sun roller 511 is a cylindrical surface of which an outer diameter is constant in an axial direction. The inner peripheral surfaces of the ring roller elements 514A, 514B are partially conical surfaces inclined in a direction in which an inner diameter increases towards tip end faces, which are facing surfaces of the ring roller elements 514A, 514B. Also, an outer peripheral surface of the intermediate roller 516 is a cylindrical surface of which an outer diameter is constant in an axial direction at an axially intermediate portion, and both axial end portions are partially conical surfaces inclined in a direction in which an outer diameter decreases towards both axial end faces of the intermediate roller 516. The rotation of the sun roller 511 is transmitted to the ring roller 515 via the respective intermediate rollers 516, and the rotation of the ring roller 515 is output from the output shaft 512 via the holding cylinder 513.

In the above configuration, the surface pressure applying device 517 is provided at the ring roller 515-side. Thereby, as compared to a configuration where the surface pressure applying device is provided at the sun roller 511-side, a radius of rotation from a rotation center of the input shaft to each rolling contact part of the inner peripheral surface of the ring roller 515 and the outer peripheral surface of each of the intermediate rollers 516 is increased. Therefore, it is possible to reduce a radius distance difference of both axial ends of a contact region (a contact ellipse) at the rolling contact part, with respect to the radius distance, so that it is possible to suppress a peripheral speed difference to be caused in the contact ellipse.

A friction roller-type reduction gear disclosed in Patent Document 2 includes a sun roller, a ring roller arranged concentrically with the sun roller, and a plurality of intermediate rollers rotatably supported between an outer peripheral surface of the sun roller and an inner peripheral surface of the ring roller. The sun roller has a pair of sun roller elements, and one sun roller element is axially approached to or separated from the other sun roller element by loading cam mechanisms, in correspondence to transmission torque, so that respective surface pressures of the sun roller elements, the intermediate roller and the ring roller are changed.

CITATION LIST

Patent Document

Patent Document 1: JP 2014-40885 A
Patent Document 2: JP 2013-104545 A

SUMMARY OF THE INVENTION

Problems To Be Solved

However, according to the configuration of Patent Document 1, inclination angles of the outer peripheral surfaces (partially conical surfaces) of both axial end portions of the intermediate roller 516 should be the same as inclination angles of the inner peripheral surfaces (partially conical surfaces) of the ring roller elements 514A, 514B. For this reason, it is necessary to complexly adjust both the inclination angles, which increases the processing cost.

Also, in order to reduce slipping between the outer peripheral surfaces of both axial end portions of the intermediate roller 516 and the inner peripheral surfaces of the ring roller elements 514A, 514B, it is considered to form the outer peripheral surface of the intermediate roller 516 into a circular arc shape. By doing so, rolling contact parts of the intermediate roller 116 and the ring roller elements 514A, 514B can be made to a point contact state where a contact area is small. However, when the outer peripheral surface of the intermediate roller 516 is made to have a circular arc shape, a contact part with the outer peripheral surface of the cylindrical sun roller 511 becomes a point contact, so that a contact surface pressure increases. Also, the intermediate roller 516 is contacted to the ring roller 515 at two places but is contacted to the sun roller 511 at one place, so that the contact surface pressure tends to increase. For this reason, the increase in the contact surface pressure between the sun roller 511 and the intermediate roller 516 may influence the durability life of the sun roller 511 configured to rotate at high speed.

In the configuration of Patent Document 2, since the pair of loading cam mechanisms is provided to bring the pair of sun roller elements close to each other or to separate from each other, the axial center position of the intermediate roller is kept constant. However, a configuration where the loading cam mechanism is provided for only one side is also adopted, from standpoints of reducing the number of components of the reduction gear, miniaturization and improvement on an assembly property. In this case, one of the pair of sun roller elements becomes a stationary sun roller element and the other becomes a moveable sun roller element, so that only the moveable sun roller element moves axially. When only the moveable sun roller element moves axially, an axial force is applied to the intermediate roller in rolling contact with each sun roller element. However, in general, since the intermediate roller is configured to be pivotally supported, without assuming axial movement, an extra friction force is generated at a traction part of the intermediate roller by the generated axial force. The friction force causes wear at the traction part. This problem is not limited to the sun roller and is also caused in a configuration where the ring roller has a pair of ring roller elements divided axially.

As a method for avoiding the wear, in a planetary gear reduction gear and the like, a needle bearing is arranged at an inner diameter-side of a gear (roller) and is supported to be rotatable and moveable axially.

However, the friction roller type has a specific problem that the roller is elastically deformed in a radial direction due to a normal force applied to the roller. That is, according to the above configuration, when the normal force to be applied to the intermediate roller increases as the transmission torque increases, an internal gap of the needle bearing decreases. Thereby, the internal gap may become a negative gap, depending on a setting of an initial gap of the needle bearing. When the needle bearing has a negative gap, a contact surface pressure of a traction surface increases beyond a design value, so that the durability life of the bearing decreases.

Also, in the needle bearing, a relative tilt (skew) is generated between a rotary shaft and raceway surfaces of inner and outer rings. The skew causes an axial load in the bearing by slipping. In general, the axial load that is to be generated by the skew has a correlation with a total sum of loads of the rolling elements. That is, in the configuration where the needle bearing is arranged at the inner diameter part of the intermediate roller, the bearing internal gap is likely to be a negative gap and the axial load due to the skew increases. When the axial force due to the skew is caused to the roller, the surface pressure of the traction surface increases, which influences the lifetime of the reduction gear.

The present invention has been made in view of the above situations, and a first object thereof is to provide a friction roller-type reduction gear capable of reducing a slipping loss between an intermediate roller and a ring roller to improve torque transmission efficiency without increasing processing cost and lowering durability of a sun roller.

Also, a second object is to provide a friction roller-type reduction gear capable of smoothly displacing a roller by loading and suppressing friction and wear without being influenced by elastic deformation of an intermediate roller even when transmission torque increases.

Means for Solving the Problems

The present invention is configured, as follows.

(1) A friction roller-type reduction gear including a sun roller arranged concentrically with an input shaft, a ring roller arranged concentrically with the sun roller at an outer periphery-side of the sun roller, a plurality of intermediate rollers supported to be rotatable about a rotation shaft parallel with the input shaft between an outer peripheral surface of the sun roller and an inner peripheral surface of the ring roller and configured to be in rolling contact with the outer peripheral surface of the sun roller and the inner peripheral surface of the ring roller, a coupling part configured to couple the ring roller and an output shaft, and a loading cam mechanism configured to change a contact surface pressure of a rolling contact surface of each roller,
wherein the ring roller includes a pair of roller elements provided in parallel in an axial direction of the input shaft,
wherein at least one of the pair of roller elements is a moveable roller element configured to be moveable axially,
wherein the loading cam mechanism is arranged at only an outer end face-side of the moveable roller element in the axial direction and is configured to displace the moveable roller element towards the other roller element, in correspondence to rotation torque of the input shaft,
wherein the outer peripheral surface of the sun roller is a concave curved surface of which a shape of an outer edge in an axial cross-section is a single circular arc-shaped concave curve, and
wherein an outer peripheral surface of the intermediate roller is a convex curved surface of which a shape of an outer edge in an axial cross-section is a single circular arc-shaped convex curve.

(2) The friction roller-type reduction gear of the above (1), wherein the loading cam mechanism comprises:
first cam grooves provided at a plurality of places along a circumferential direction of an outer end face of the moveable roller element;
a cam ring provided with second cam grooves arranged to face the outer end face of the moveable roller element and provided at a plurality of places corresponding to the first cam grooves; and
a plurality of rolling elements interposed between the first cam grooves and the second cam grooves, and
wherein each of the first cam grooves and the second cam grooves has a shape in which a depth in the axial direction gradually changes along the circumferential direction and becomes shallower towards a circumferential end portion of the cam groove.

(3) The friction roller-type reduction gear of the above (1) or (2), wherein one roller of the intermediate rollers, the sun roller and the ring roller is supported to be rotatable axially and not to be displaceable axially, and
wherein rollers except for the one roller are supported to be rotatable axially and to be displaceable axially.

(4) The friction roller-type reduction gear of the above (3), further comprising a holder provided for each of the intermediate rollers and configured to support the rotation shaft,
wherein the rotation shaft is provided to extend from both end portions of a roller main body of the intermediate roller, the roller main body provided at an outer peripheral surface with a traction surface in rolling contact with the outer peripheral surface of the sun roller and the inner peripheral surface of the ring roller, and
wherein the holder has a gap, in which the intermediate roller is movable in the axial direction, between a holder inner surface and an end face of the roller main body, and is configured to support the rotation shaft to be rotatable and to be moveable axially via a needle bearing.

Effects of the Invention

According to the friction roller-type reduction gear of the present invention, the loading cam mechanism arranged at the ring roller-side is provided, the outer peripheral surface of the sun roller is a concave curved surface of which the shape of the outer edge in the axial cross-section is a single circular arc-shaped concave curve, and the outer peripheral surface of the intermediate roller is a convex curved surface of which the shape of the outer edge in the axial cross-section is a single circular arc-shaped convex curve. Therefore, it is possible to reduce a difference of peripheral speeds at both axial ends and a central portion of a contact region of the rolling contact part of the intermediate roller and the ring roller, without increasing the processing cost. Thereby, it is possible to reduce the friction loss and to improve the torque transmission efficiency. Also, it is possible to reduce the contact surface pressure of the rolling contact part of the outer peripheral surface of the intermediate roller and the outer peripheral surface of the sun roller, thereby improving the durability of the sun roller.

Also, according to the present invention, since the rotation shaft extending to both end portions of the intermediate roller is supported to the holder via the needle bearing, it is possible to support the intermediate roller to be rotatable and to be moveable axially. By this configuration, even when the normal force is applied to the intermediate roller, in correspondence to the transmission torque, the internal gap of the needle bearing is not changed, so that it is possible to improve the durability life of the bearing. Also, a support span of the intermediate roller increases, so that the skew is difficult to occur.

BRIEF DESCRIPTION OF THE DRAWINGS

FIGS. 4A and 4B are sectional views taken along a line IV-IV of FIG. 3, in which FIG. 4A is a sectional view depicting a state where the loading cam mechanism does not generate thrust and FIG. 4B depicts a state where the loading cam mechanism generates thrust.

FIGS. 7A and 7B illustrate effects that are to be accomplished when the friction roller-type reduction gear is incorporated into a driving device for electric car, in which FIG. 7A is a graph depicting a change in driving torque relative to a traveling speed when a transmission is provided and FIG. 7B is a graph depicting a change in driving torque relative to a traveling speed when a transmission is not provided.

DETAILED DESCRIPTION OF EMBODIMENTS

Hereinafter, embodiments of the present invention will be described in detail with reference to the drawings.

First Configuration Example

A first configuration example of a friction roller-type reduction gear for illustrating an embodiment of the present invention is first described.

<Configuration of Friction Roller-Type Reduction Gear>

Figure 1:
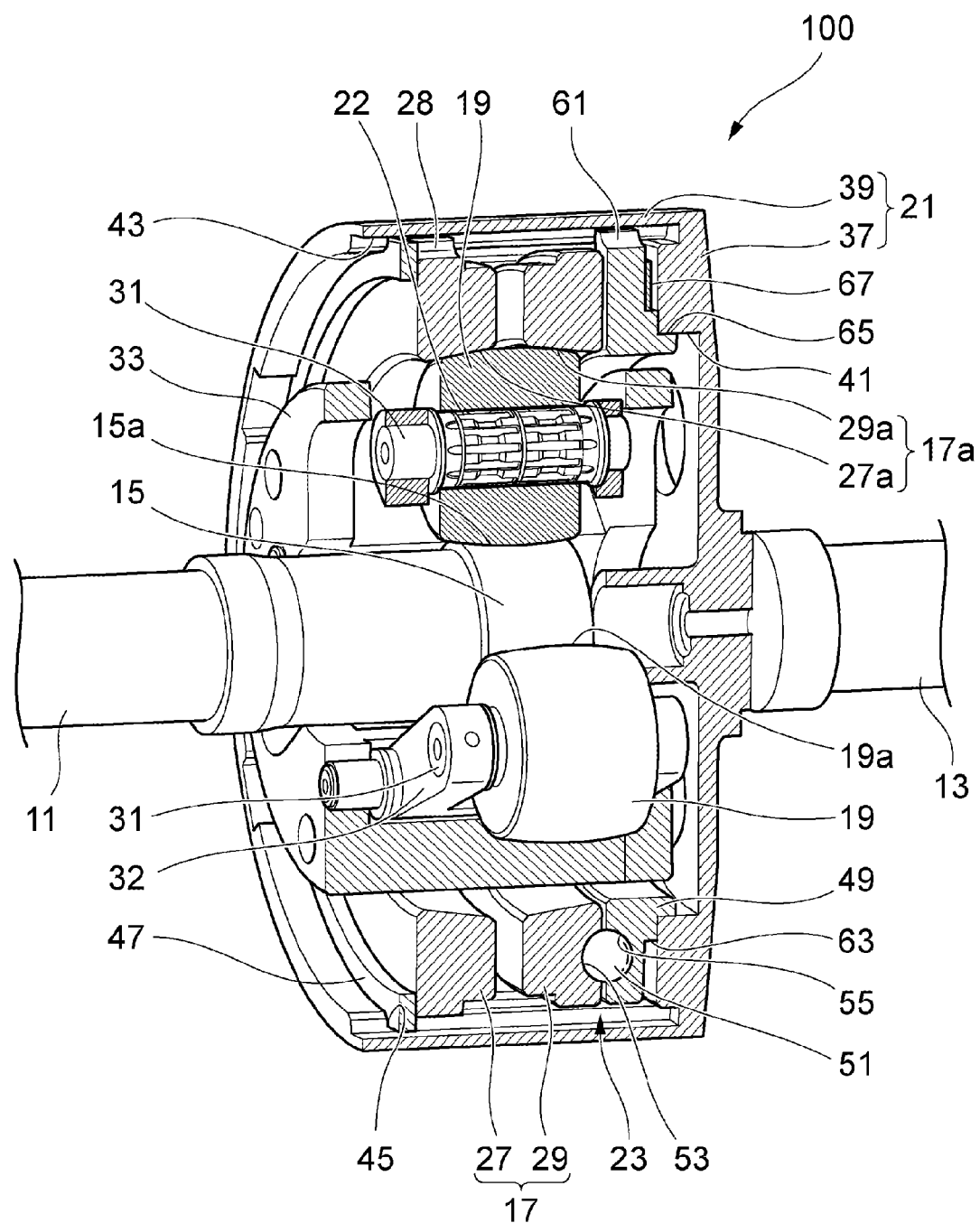
FIG. 1 is a partially sectional perspective view of a friction roller-type reduction gear in accordance with a first configuration example.
Figure 2:
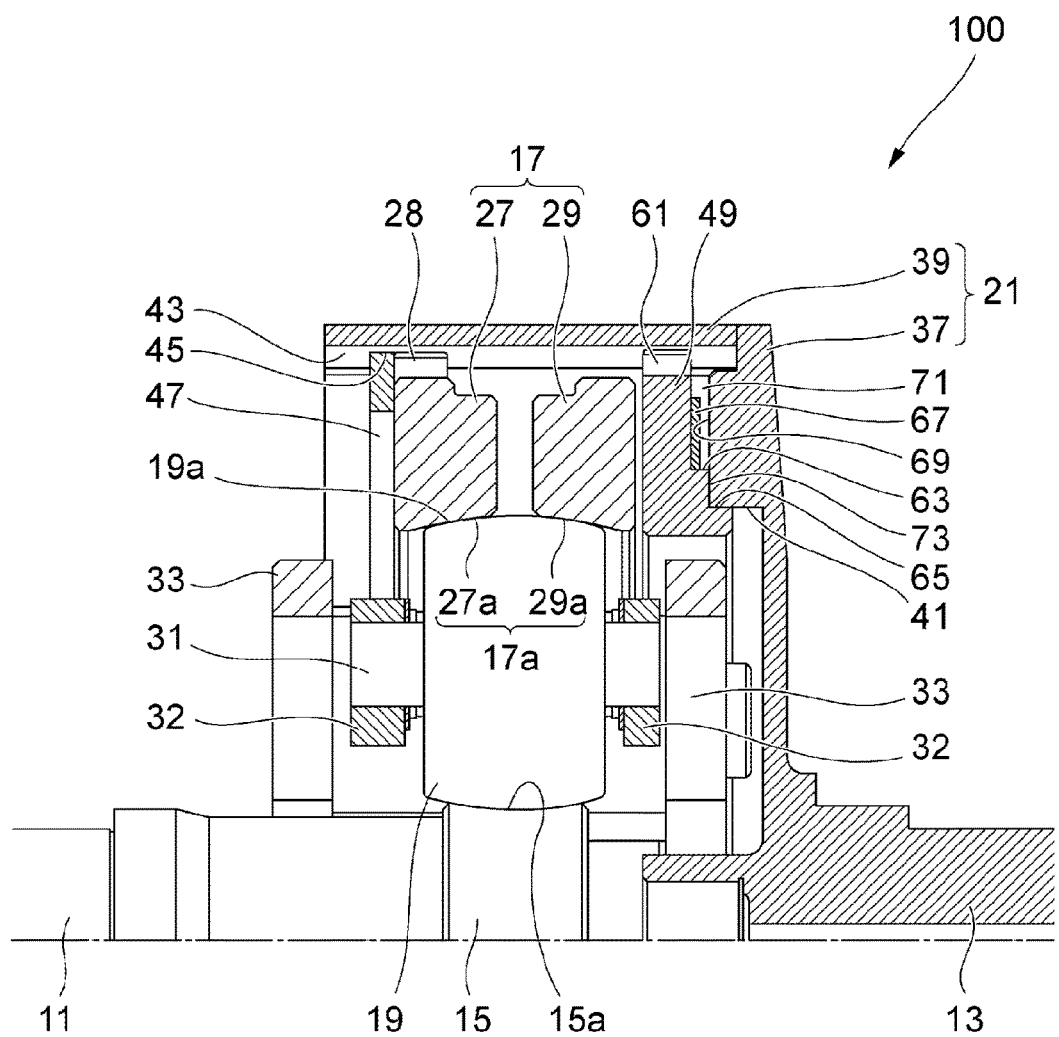
FIG. 2 is an enlarged sectional view of main parts of the friction roller-type reduction gear shown in FIG. 1.

FIG. 1 is a partially sectional perspective view of a friction roller-type reduction gear in accordance with a first configuration example, and FIG. 2 is an enlarged sectional view of main parts of the friction roller-type reduction gear. As shown in FIGS. 1 and 2, a friction roller-type reduction gear 100 includes a sun roller 15 arranged concentrically with an input shaft 11, a ring roller 17, a plurality of intermediate rollers 19, a coupling part 21 configured to couple the ring roller 17 and an output shaft 13, and a loading cam mechanism 23.

The sun roller 15 is a solid roller formed integrally with one end of the input shaft 11 and concentrically with the input shaft 11. An outer peripheral surface 15a of the sun roller 15 is formed as a concave curved surface of which a shape of an outer edge in an axial cross-section is a single circular arc-shaped concave curve.

The ring roller 17 has a stationary ring roller element 27 and a moveable ring roller element 29 configured to be moveable axially, as a pair of ring roller elements provided in parallel in an axial direction. Each of the ring roller elements 27, 29 is arranged concentrically with the sun roller 15 at an outer periphery-side of the sun roller 15 with being accommodated in the cup-shaped coupling part 21.

The stationary ring roller element 27 and the moveable ring roller element 29 have inner peripheral surfaces 27a, 29a configured as annular inclined surfaces. The inclined surfaces are inclined surfaces of which distances to a center of a rotation shaft of the intermediate roller 19 gradually decrease from facing end faces 133, 135 of the respective ring roller elements 27, 29 towards outer end faces 137, 139 of an axially opposite side. That is, the inclined surfaces are inclined surfaces of which inner diameters gradually decrease towards the outer end faces 137, 139. The inclined surfaces are rolling contact surfaces on which the intermediate roller 19 is to roll. The inner peripheral surfaces 27a, 29a are not limited to the inclined surfaces and may be a concave curved surface of which a shape of an outer edge in an axial cross-section is a single circular arc-shaped concave curve, respectively.

Each of the plurality of intermediate rollers 19 is supported to a support shaft (a rotation shaft) 31 to be rotatable and to be displaceable axially via a needle bearing 22 and is arranged between the outer peripheral surface 15a of the sun roller 15 and an inner peripheral surface 17a of the ring roller 17. Both ends of the support shaft 31 are supported to a swinging holder 32. Also, the swinging holder 32 is supported to a carrier 33 so that the intermediate roller 19 is to be moveable (swingable) in a radial direction of the input shaft 11. The carrier 33 is fixed to a motor main body (not shown) by a fastening member.

An outer peripheral surface 19a of each of the intermediate rollers 19 is a convex curved surface of which a shape of an outer edge in an axial cross-section is a single circular arc-shaped convex curve, and is configured to be in rolling contact with the outer peripheral surface 15a of the sun roller 15 and the inner peripheral surface 17a of the ring roller 17.

The coupling part 21 has a base end portion 37 having a substantially circular plate shape and a central portion coupled to the output shaft 13 and a cylindrical roller holding part 39 extending axially from an outer peripheral edge of the base end portion 37 and configured to hold the ring roller 17 to an inner diameter-side thereof.

In the roller holding part 39, a corrugated plate-shaped preload spring 67, a cam ring 49, a ball 51 (rolling element), the moveable ring roller element 29, the stationary ring roller element 27 and a snap ring 47 are inserted in corresponding order from the base end portion 37, and the respective members are mounted to the roller holding part 39.

An inner periphery of the roller holding part 39 is axially formed with a plurality of concave grooves 43. Also, an inner periphery of an end portion of the roller holding part 39 opposite to the base end portion 37 is circumferentially formed with a ring groove 45 (refer to FIG. 1).

The concave grooves 43 are configured to accommodate therein a plurality of projections 28 formed at a plurality of places of the outer periphery of the stationary ring roller element 27 and protruding radially outwards. The projections 28 of the stationary ring roller element 27 are engaged with the concave grooves 43 of the roller holding part 39 without rattling in a rotation direction so as to transmit rotation torque between the roller holding part 39 and the ring roller 17.

In the ring groove 45, the snap ring 47 is fitted. The snap ring 47 is configured to restrain an axial position of the stationary ring roller element 27 and to fix the stationary ring roller element 27 to the roller holding part 39.

The base end portion 37 of the coupling part 21 is formed by cutting processing such as lathe processing, for example, and the roller holding part 39 is formed by plastic processing such as press forming. The base end portion 37 and the roller holding part 39 are formed into a single body and are then bonded, so that it is possible to precisely match shaft centers at low cost. Also, the base end portion 37 and the roller holding part 39 are bonded by beam welding. Thereby, it is possible to heat and bond the same with beads of a narrow width in a short time, so that it is possible to suppress thermal strain to the minimum and occurrence of misalignment.

The cam ring 49 has a plurality of projections 61 protruding radially outwards from an outer periphery thereof. The projections 61 of the cam ring 49 are engaged with the concave grooves 43 of the roller holding part 39, like the projections 28 of the stationary ring roller element 27.

The cam ring 49 is formed at an outer end face of an output shaft-side with a notched portion 63 obtained by annularly notching a part of an outer diameter-side, and the preload spring 67 is mounted to the notched portion 63.

Since the sun roller 15 is configured to rotate at high speed, when a center of gravity of the sun roller slightly deviates, the sun roller may be a vibration source of abnormal vibrations. However, since the sun roller 15 of the first configuration example is formed integrally with the input shaft 11, it is possible to easily correct a balance and to reduce occurrence of vibrations. Also, since the sun roller 15 has high stiffness and a high resonance frequency, occurrence of abnormal vibrations due to the resonance is reduced. Also, the sun roller 15 has a solid structure, so that an elastic deformation amount of the sun roller 15, which is to be caused when load is applied, is reduced (which will be described later). Thereby, axial displacement amounts of the intermediate roller 19 and the ring roller 17 are reduced, so that it is possible to favorably keep a contact state of the rolling contact surface, as it is designed.

<Loading Cam Mechanism>

Subsequently, the loading cam mechanism is described.

The moveable ring roller element 29, the cam ring 49 and the ball 51 (a rolling element), which are shown in FIG. 1, configure the loading cam mechanism 23. The loading cam mechanism 23 is configured to change contact surface pressures of respective rolling contact surfaces of the sun roller 15, the ring roller 17 and the intermediate roller 19.

Figure 3:
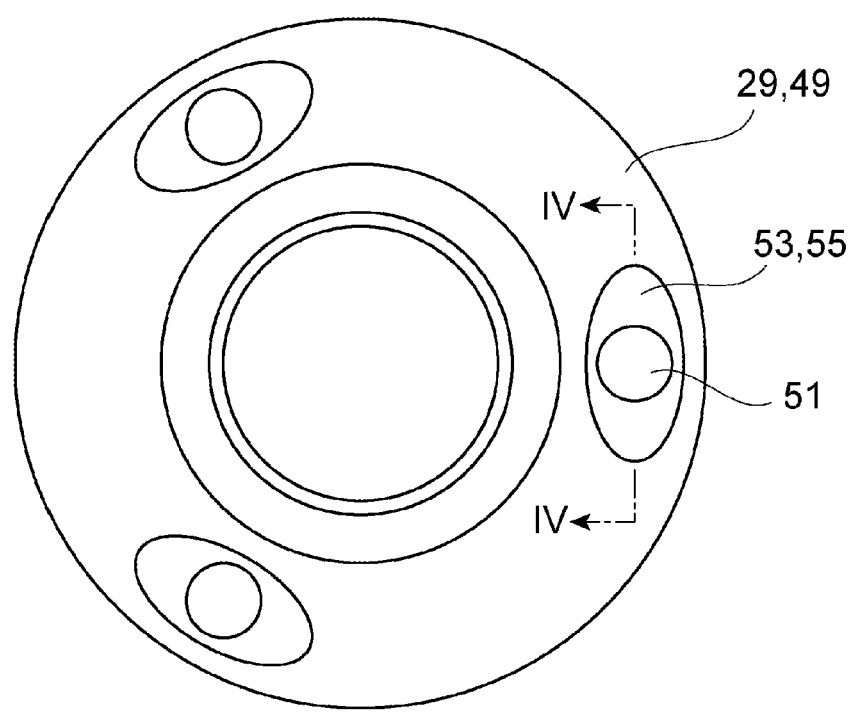
FIG. 3 is a plan view of a cam ring depicting a cam surface of a loading cam mechanism.

As shown in FIGS. 3 and 4, an outer end face of the moveable ring roller element 29 is formed with a plurality of (three, in the shown example) first cam grooves 53 in a circumferential direction. The cam ring 49 is formed with a plurality of (three, in the shown example) second cam grooves 55 arranged to face the first cam grooves 53 at circumferential positions corresponding to the first cam grooves 53. The balls 51 are interposed between the first cam grooves 53 and the second cam grooves 55, respectively.

Each of the first cam grooves 53 and the second cam grooves 55 has a shape in which a groove depth in the axial direction is greatest at a central portion in the circumferential direction, gradually changes along the circumferential direction and becomes shallower towards a circumferential end portion of each of the cam grooves 53, 55.

Figure 4A:
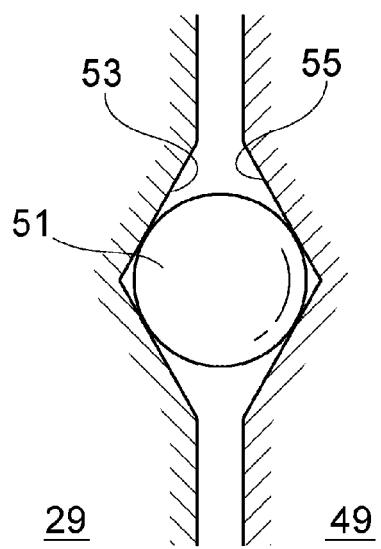

As shown in FIG. 4A, at a state where the input shaft 11 is stationary, each ball 51 is positioned at the deepest portion of each cam groove. At this state, the cam ring 49 is pressed towards the moveable ring roller element 29 by an elastic force of the preload spring 67.

Figure 4B:
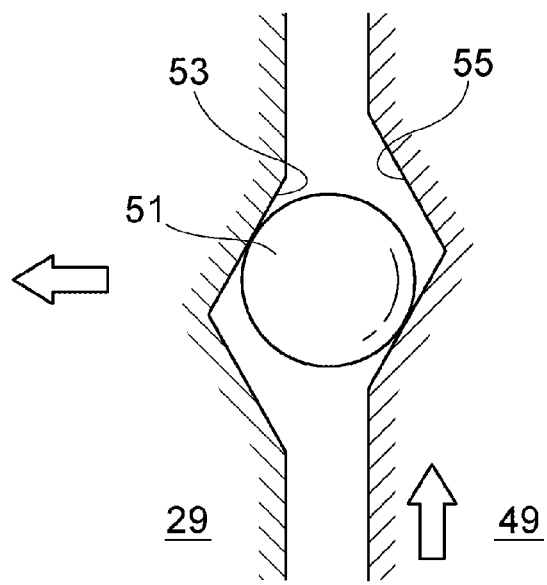

When the input shaft 11 is rotatively driven, each ball 51 moves to the shallow portions of the respective cam grooves 53, 55, as shown in FIG. 4B. Thereby, axial thrust of pressing the moveable ring roller element 29 towards the stationary ring roller element 27 is generated. The axial thrust generated by the loading cam mechanism 23 shortens an interval between the stationary ring roller element 27 and the moveable ring roller element 29. Then, a contact surface pressure of a rolling contact part of the inner peripheral surface 17a of the ring roller 17 and the outer peripheral surface 19a of each of the intermediate rollers 19 increases. Also, a contact surface pressure of a rolling contact part of the outer peripheral surface 19a of each of the intermediate rollers 19 and the outer peripheral surface 15a of the sun roller 15 increases. As a result, the contact surface pressures of the plurality of rolling contact parts existing between the input shaft 11 and the output shaft 13 increase. The contact surface pressures increase as the torque to be transmitted between the input shaft 11 and the output shaft 13 increases.

Also, the axial thrust generated by the loading cam mechanism 23 causes the elastic deformation in a traction component such as the ring roller 17 and the elastic deformation of each contact point. Also, the intermediate roller 19 is axially displaced towards the stationary ring roller element 27 as the moveable ring roller element 29 is axially displaced.

<Structure of Matching Shaft Centers of Respective Members>

As shown in FIG. 2, an inner surface, which faces towards the input shaft 11, of the base end portion 37 of the coupling part 21 is formed with a first annular stepped portion 41 having an inner peripheral surface parallel with the output shaft 13.

Also, an outer end face of the cam ring 49 is formed with a second stepped portion 65 protruding axially, formed concentrically with a ring center and having an outer peripheral surface to be axially engaged with the first stepped portion 41 of the base end portion 37 of the coupling part 21.

The first stepped portion 41 and the second stepped portion 65 are fitted to each other, so that the shaft centers of the cam ring 49 and the coupling part 21 are matched with precision. Thereby, a shaft center position of the moveable ring roller element 29 is also precisely positioned via the cam ring 49. Also, the stationary ring roller element 27 is radially positioned by the intermediate roller 19. The intermediate roller 19 is radially positioned by the sun roller 15 concentric with the input shaft 11, and the input shaft 11 and the output shaft 13 are concentrically arranged. Thereby, the respective shaft centers of the sun roller 15, the intermediate roller 19, the ring roller 17 and the cam ring 49 are precisely matched.

Also, the preload spring 67 is arranged in an annular space 71 formed by the notched portion 63 between an inner surface 69 of the base end portion 37 of the coupling part 21 and the cam ring. At a state where the cam ring 49 is urged towards an axially opposite side to the base end portion 37 by the preload spring 67, the second stepped portion 65 is fitted to the first stepped portion 41 of the base end portion 37. The fitting length is longer than an elastic deformation value of the preload spring 67. Thereby, when mounting the cam ring 49 to the base end portion 37, the preload spring 67 does not deviate from a space between the cam ring 49 and the base end portion 37, so that the assembling property of the reduction gear is improved.

<Offset of Axial Position of Intermediate Roller>

Subsequently, offset of the axial position of the intermediate roller 19 is described.

Figure 5:
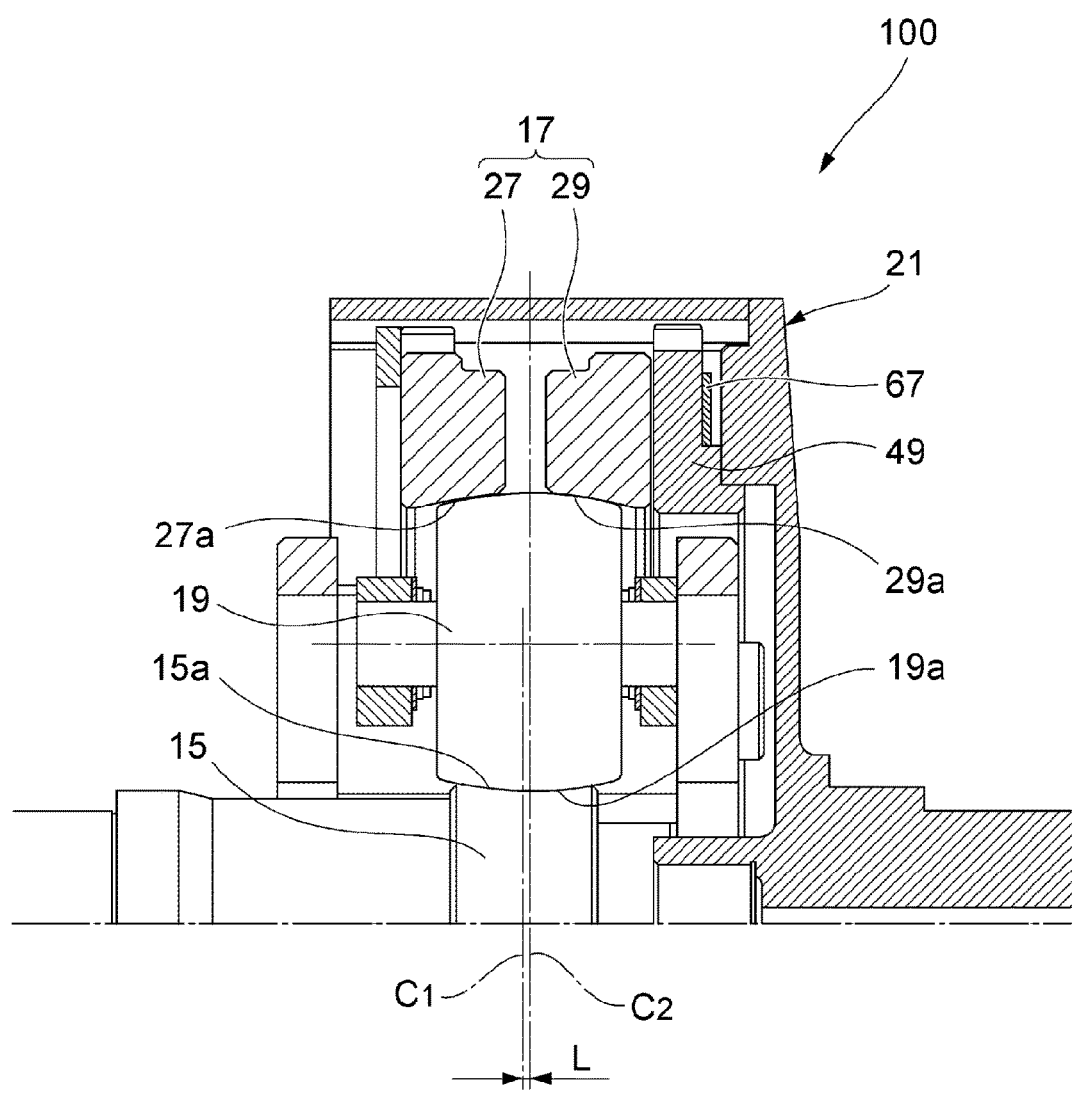
FIG. 5 is an enlarged sectional view of main parts of the friction roller-type reduction gear, depicting a state where a center of a circular arc-shaped convex curved surface of an outer peripheral surface of an intermediate roller is offset with respect to a center of a circular arc-shaped concave curved surface of an outer peripheral surface of a sun roller, at an unloaded state.

FIG. 5 depicts an offset state of the intermediate roller 19 at an unloaded state. At the unloaded state, a center of the circular arc-shaped convex curved surface of the outer peripheral surface of the intermediate roller 19 is axially offset by a predetermined amount with respect to a center of the circular arc-shaped concave curved surface of the outer peripheral surface of the sun roller 15.

At the unloaded state (refer to FIG. 4A) where the input shaft 11 is stationary and the cam ring 49 is pressed only by the elastic force of the preload spring 67, a center C2 of the circular arc-shaped convex curved surface, which is the outer peripheral surface 19a of the intermediate roller 19, is axially offset towards the cam ring 49 by a predetermined amount L with respect to a center C1 of the circular arc-shaped concave curved surface, which is the outer peripheral surface 15a of the sun roller 15. Also, a center of the ring roller 17 in rolling contact with the intermediate roller 19 is offset by the predetermined amount L. In the meantime, the offset amount L will be described later in detail.

Herein, when the input shaft 11 is rotatively rotated (refer to FIG. 4B), the intermediate roller 19 is also axially displaced towards the stationary ring roller element 27 in connection with the movement of the moveable ring roller element 29 by the elastic deformation of the traction component such as the ring roller 17 and the elastic deformation of each contact point. Thereby, the center C2 of the outer peripheral surface 19a of the intermediate roller 19 comes close to the center C1 of the outer peripheral surface 15a of the sun roller 15. As a result, the offset amount L decreases, so that the displacement is made in a direction in which the circular arc-shaped convex curved surface of the intermediate roller 19 and the circular arc-shaped concave curved surface of the sun roller 15 coincide with each other. In the meantime, the axial displacement amount of the intermediate roller 19 is about a half of the axial displacement amount of the moveable ring roller element 29.

Also, since a reaction force to the pressing force is applied to the cam ring 49, the cam ring 49 moves in an opposite direction to the pressing direction while pressing and crushing the preload spring 67, so that an outer surface 73 of the second stepped portion 65 is contacted to the inner surface 69 of the base end portion 37 and the axial position of the cam ring 49 is restrained.

When the loading cam mechanism 23 generates the axial thrust, the interval between the stationary ring roller element 27 and the moveable ring roller element 29 decreases. Then, the contact surface pressure of the rolling contact part of the inner peripheral surface 17a of the ring roller 17 configured by the stationary ring roller element 27 and the moveable ring roller element 29 and the outer peripheral surface 19a of each of the intermediate rollers 19 increases. As the contact surface pressure increases, the contact surface pressure of the rolling contact part of the outer peripheral surface 19a of each of the intermediate rollers 19 and the outer peripheral surface 15a of the sun roller 15 increases, too. As a result, the contact surface pressures of the plurality of rolling contact parts existing between the input shaft 11 and the output shaft 13 increase as the torque to be transmitted between the input shaft 11 and the output shaft 13 increases.

At the state where the input shaft 11 is rotatively driven, the rotation of the input shaft 11 is transmitted from the sun roller 15 to each of the intermediate rollers 19. Then, each of the intermediate rollers 19 rotates about the support shaft 31. As each of the intermediate roller 19 rotates, the ring roller 17 rotates and the projections 28 of the stationary ring roller element 27 are engaged with the concave grooves 43 of the roller holding part 39, so that the output shaft 13 connected to the roller holding part 39 rotates.

At this time, the contact surface pressure of each of the rolling contact parts becomes an appropriate surface pressure corresponding to a magnitude of the torque to be transmitted between the input shaft 11 and the output shaft 13. Therefore, each of the rolling contact parts is prevented from excessively slipping and the contact surface pressure of each of the rolling contact parts is prevented from excessively increasing.

Also, while the torque is transmitted between the input shaft 11 and the output shaft 13, the stationary ring roller element 27 is contacted to the snap ring 47, so that the axial position thereof is restrained. Also, the outer surface 73 of the second stepped portion 65 and the inner surface 69 of the base end portion 37 are contacted to each other, so that the axial position of the cam ring 49 is restrained. That is, the stationary ring roller element 27 having the projections 28 and the cam ring 49 having the projections 61 are engaged with the concave grooves 43, so that the rotation power is transmitted thereto and the stationary ring roller element and the cam ring are not substantially displaced in the axial direction. For this reason, it is possible to prevent the wear at the engaging portions.

Figure 7A:
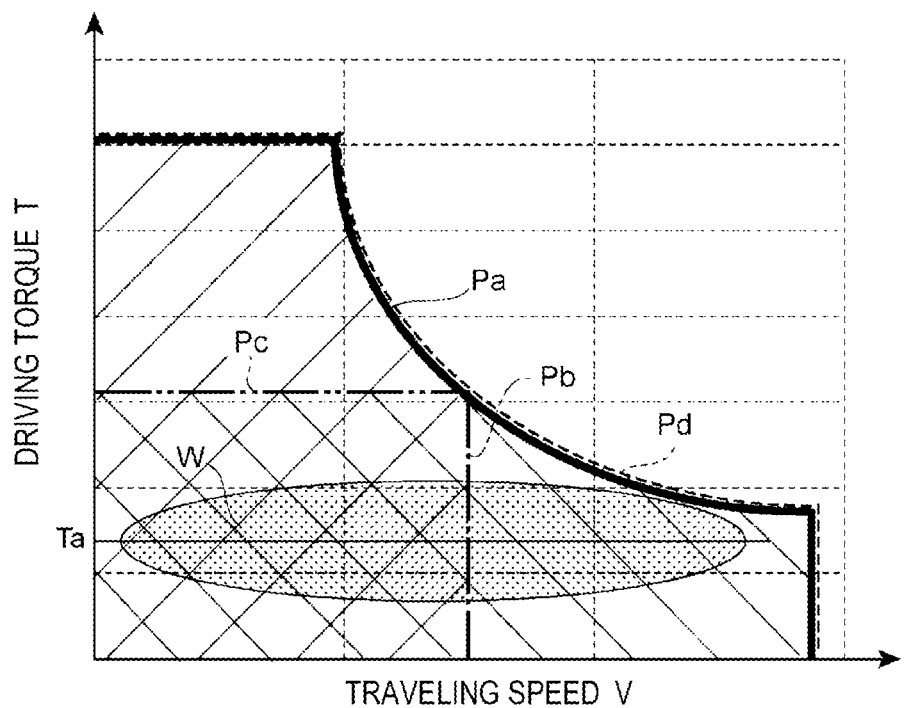
Figure 7B:
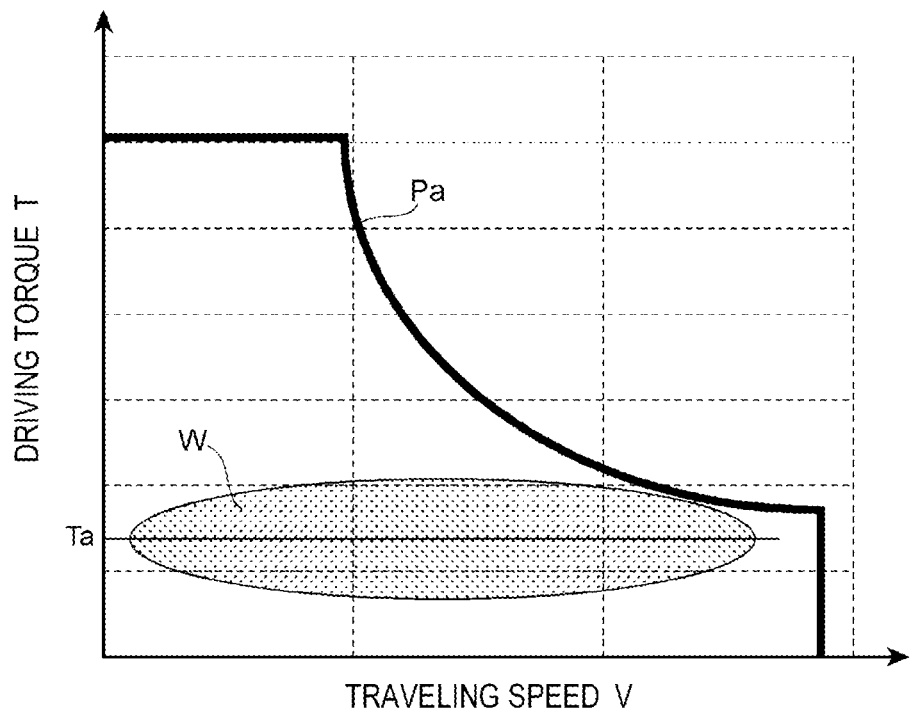
Figure 8:
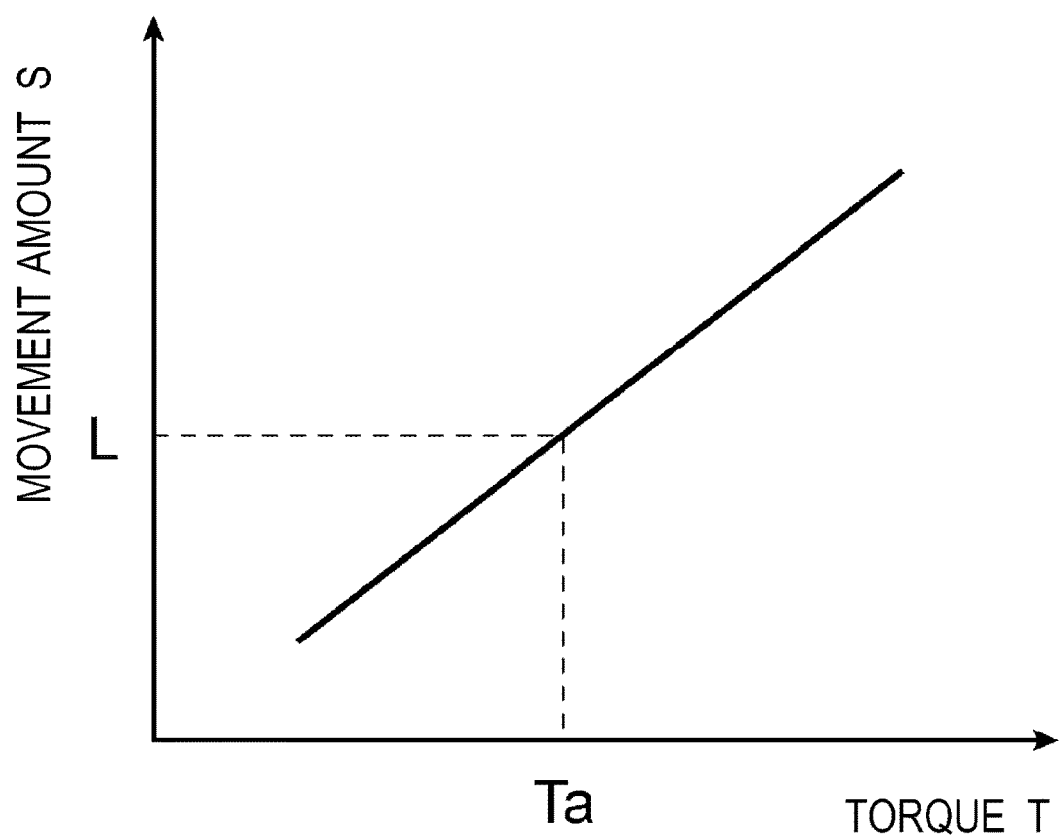
FIG. 8 is a graph depicting a relation between transmission torque and an axial movement amount of the intermediate roller.
Figure 9:
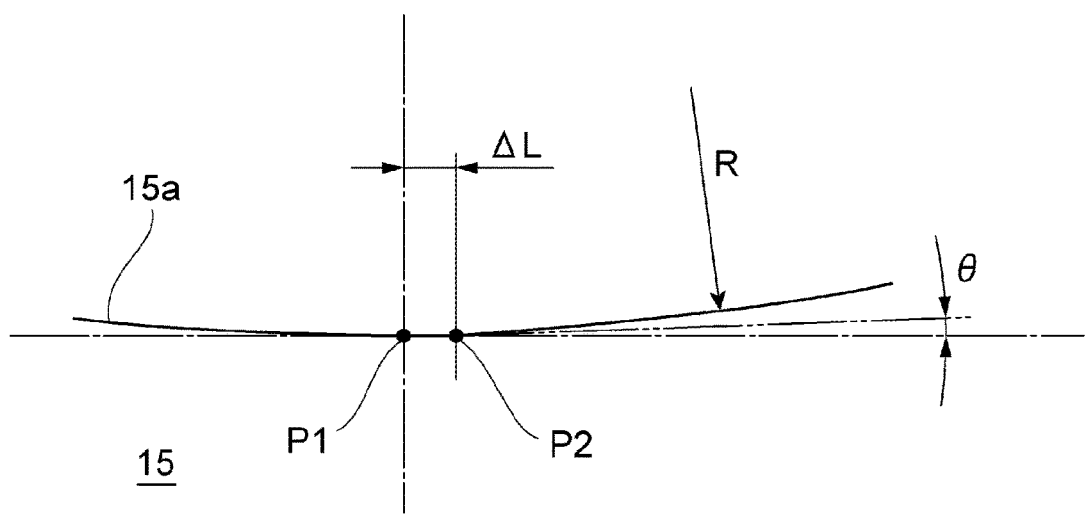
FIG. 9 is an enlarged view illustrating a point spaced from an apex of the circular arc-shaped concave curved surface of the sun roller and an inclination angle at that point.

Herein, the offset amount L is described. FIGS. 7A and 7B illustrate an effect that is to be accomplished when the friction roller-type reduction gear is incorporated into a driving device for electric car, and FIG. 8 is a graph depicting a relation between an axial movement amount of the intermediate roller and transmission torque.

For example, when a power transmission device having a high reduction gear ratio is provided between an output shaft of an electric motor, which is a driving source of an electric car, and an input part of a differential gear to be coupled to driving wheels, a relation between driving torque T and traveling speed V of the electric car has such a characteristic that a left half part of a solid line Pa and a dashed-dotted line Pb in FIG. 7A are continuous to each other. That is, the acceleration performance is favorable at low speed but is not favorable upon high-speed traveling.

In contrast, when a power transmission device having a low reduction gear ratio is provided, a relation between the driving torque T and the traveling speed V has such a characteristic that a dashed-two dotted line Pc and a right half part of the solid line Pa are continuous to each other. That is, the high-speed traveling is possible but the acceleration performance is lowered at low speed. Also, when a transmission is provided between the output shaft and the input part and a reduction gear ratio of the transmission is changed in correspondence to a vehicle speed, a characteristic that the left half part and right half part of the solid line Pa are continuous to each other is obtained. This characteristic is substantially equivalent to a characteristic of a gasoline engine vehicle having an output substantially the same as that shown with a broken line Pd in FIG. 7A.

In the meantime, during the actual vehicle traveling, a low-speed and high-torque region is used upon start of the vehicle. However, at a usual traveling state that is general used very often, a region of medium to high speeds and low torque (refer to a region W in FIG. 7A) is frequently used. Average driving torque in the corresponding region that is frequently used is denoted with Ta.

In the meantime, as pictorially shown in FIG. 8, it has been known that the driving torque T to be output to the output shaft 13 of the friction roller-type reduction gear 100 of the present invention and the axial movement amount S of the intermediate roller 19 are substantially proportional to each other.

Figure 6:
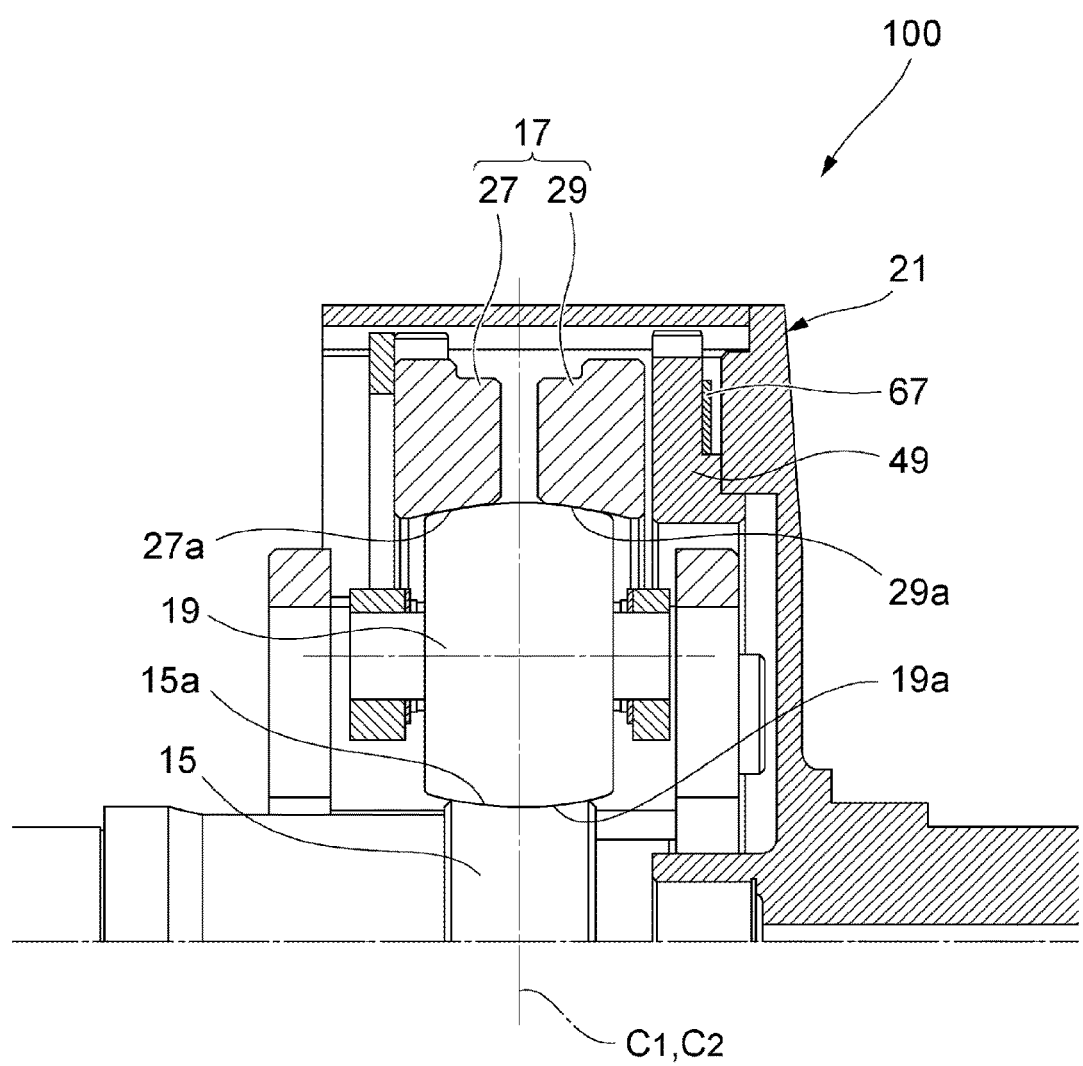
FIG. 6 is an enlarged sectional view of main parts of the friction roller-type reduction gear, depicting a state where the center of the circular arc-shaped concave curved surface of the outer peripheral surface of the sun roller is matched with the center of the circular arc-shaped convex curved surface of the outer peripheral surface of the intermediate roller, at a loaded condition.

Therefore, when the axial movement amount S of the intermediate roller 19 configured to output the average torque Ta of the region, which is frequently used during the usual traveling, is set to the offset amount L between the center C2 of the outer peripheral surface 19a of the intermediate roller 19 and the center C1 of the outer peripheral surface 15a of the sun roller 15, during most of time of the operating time period, the friction roller-type reduction gear 100 is at a state where the offset amount is zero, i.e., a state where the center C1 of the circular arc-shaped concave curved surface of the sun roller 15 and the center C2 of the circular arc-shaped convex curved surface of the intermediate roller 19 are matched, as shown in FIG. 6.

Thereby, during most of time of the operating time period of the friction roller-type reduction gear 100, the rolling contact parts of the sun roller 15 and the intermediate roller 19 can be maintained at the favorable contact state, so that the durability of the reduction gear is improved. Also, since a state where a contact ellipse becoming a contact point between the sun roller 15 and the intermediate roller 19 is not inclined relative to an axial direction of the bearing is maintained, the transmission efficiency of the torque is improved.

As shown in FIG. 7B, the above is also the same in a case where a transmission is not provided between the output shaft and the input part and a power transmission device improved in the substantially same level as the characteristic of a gasoline engine vehicle is used. That is, regarding the characteristics denoted with the solid line Pa, the average driving torque in the region W that is frequently used is denoted as Ta. The axial movement amount S of the intermediate roller 19 configured to output the torque Ta is set to the offset amount L between the center C2 of the outer peripheral surface 19a of the intermediate roller 19 and the center C1 of the outer peripheral surface 15a of the sun roller 15. Thereby, for the same reasons as above, the rolling contact parts can be maintained at the favorable contact state, so that the transmission efficiency of the torque can be improved.

<Effects of Friction Roller-Type Reduction Gear>

The outer peripheral surface 19a of the intermediate roller 19 is configured as the circular arc-shaped convex curved surface. For this reason, the contact between the ring roller 17 and the intermediate roller 19 becomes a point contact, so that it is possible to reduce the slipping loss at the rolling contact parts. Also, since it is possible to reduce a crowning radius of the circular arc-shaped convex curved surface of the intermediate roller 19, it is possible to reduce an equivalent radius of the contact surfaces of the intermediate roller 19 and the ring roller 17, thereby reducing the slipping loss.

Also, the outer peripheral surface 15a of the sun roller 15 is configured as the circular arc-shaped concave curved surface. For this reason, the contact between the sun roller 15 and the intermediate roller 19 becomes a combination of a circular arc-shaped concave curved surface and a circular arc-shaped convex curved surface, so that an area of the rolling contact region with the outer peripheral surface 19a of the intermediate roller 19 increases. As a result, the contact surface pressure of the rolling contact region is reduced, so that the wear of the sun roller 15 is suppressed and the durability of the reduction gear is improved.

Also, the loading cam mechanism 23 is provided at the ring roller 17-side. For this reason, as compared to a configuration where the loading cam mechanism is provided at the sun roller 15-side, a radius distance from the center of rotation of the ring roller 17 to the rolling contact part of the inner peripheral surface 17a of the ring roller 17 and the outer peripheral surface 19a of each intermediate roller 19 becomes longer. Thereby, it is possible to reduce a difference of peripheral speeds at both ends of the rolling contact region (contact ellipse), so that it is possible to reduce the friction loss at the rolling contact part of the ring roller 17-side and to transmit the torque with high efficiency.

<Dimensions of Respective Members>

One specific dimension example of the friction roller-type reduction gear 100 having the above configuration is described below. The outer peripheral surface 15a of the sun roller 15 is a circular arc-shaped concave curved surface of which a shape of an outer edge in an axial cross-section is a single circular arc-shaped concave curve, and has a diameter of 30 mm. Also, a reverse crowning radius of the circular arc-shaped concave curved surface is 19 mm or greater and is over about 1.08 times as large as the crowning radius of the intermediate roller 19. The outer peripheral surface 19a of the intermediate roller 19 is a circular arc-shaped convex curved surface of which a shape of an outer edge in an axial cross-section is a single circular arc-shaped convex curve, and has a diameter of 50 mm.

The reverse crowning radius 19 mm of the sun roller 15 is a dimension by which an inclination angle θ of a point P2 offset by a distance ΔL(=1 mm) from an apex P1 of the reverse crowning is 3°, as shown in FIG. 3. If the reverse crowning radius is set to 19 mm or smaller, an inclination angle is caused at the contact point between the sun roller 15 and the intermediate roller 19 due to the displacement of the intermediate roller 19, so that the slipping loss increases and the torque transmission efficiency is lowered.

For example, when a diameter of the sun roller 15 is set to 30 mm, a diameter of the intermediate roller 19 is set to 50 mm and a transmission tangential force is set to 1,000N, the torque transmission efficiency is lowered by 5% if the inclination angle θ is 3°. Like this, if the reverse crowning radius of the sun roller 15 is set to 19 mm or smaller, the torque transmission efficiency of the friction roller-type reduction gear 100 is considerably lowered.

The smaller the difference between the reverse crowning radius of the sun roller 15 and the crowning radius of the intermediate roller 19, the contact ellipse of the rolling contact region becomes larger, so that the durability is improved. However, due to non-uniformity of the respective crowning radii, a contact may be caused at an unintended portion. Therefore, it is preferably to set the reverse crowning radius of the sun roller 15 greater than the crowning radius of the intermediate roller 19 by 1.08 times or greater, rather than a configuration where the reverse crowning radius of the sun roller 15 and the crowning radius of the intermediate roller 19 are set to be the same.

The smaller the axial displacement amount of the intermediate roller 19 upon loaded operation, the performance of the friction roller-type reduction gear 100 becomes more stable. Therefore, the axial displacement amount is preferably suppressed to 2 mm or smaller. Also, the axial displacement amount of the ring roller 17 is about two times as large as the axial displacement amount of the intermediate roller 19. If the axial displacement amount of the ring roller 17 is extremely increased, the ball 51 is separated from the loading cam mechanism 23.

<Effect of Skew of Roller in Loading Cam Mechanism>

Many friction roller-type reduction gears configured to apply a normal force corresponding to transmission torque to a roller by using the loading cam mechanism 23 have been suggested. It has been also known that a skew occurring at the roller of the reduction gear highly influences the torque transmission efficiency and the durability of the reduction gear and a design of a peripheral component, and a variety of measures against the influence have been also suggested.

For example, when a skew occurs at the roller, a skew force is generated in an axial direction of the roller and axial load is applied to a support bearing of each roller. The axial load influences friction torque and durability life of the support bearing.

Also, in a friction roller-type reduction gear having an inclination angle on a traction surface, when the skew occurs at the roller, the skew force is converted into a normal force of the traction surface. For this reason, the contact surface pressure of the traction surface becomes excessive with respect to the transmission torque, so that the torque transmission efficiency and the durability life are lowered. Also, in some cases, the reduction gear may be broken.

Therefore, it is important not to increase the skew force and the normal force of the traction surface at an accelerated pace even when the skew occurs at the roller. In the below, a condition by which the normal force is to converge without diverging is described in detail. In below descriptions, the same members as the above members are denoted with the same reference numerals, and the descriptions thereof are simplified or omitted.

Figure 10:
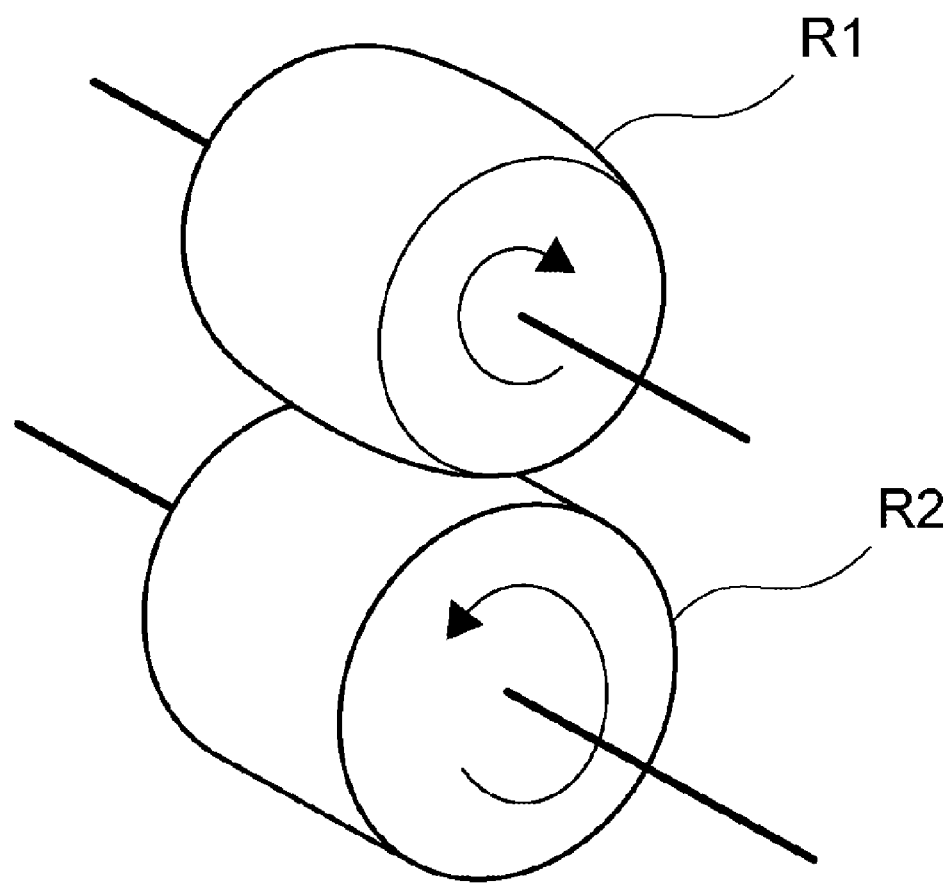
FIG. 10 pictorially illustrates a pair of rollers.
Figure 11A:
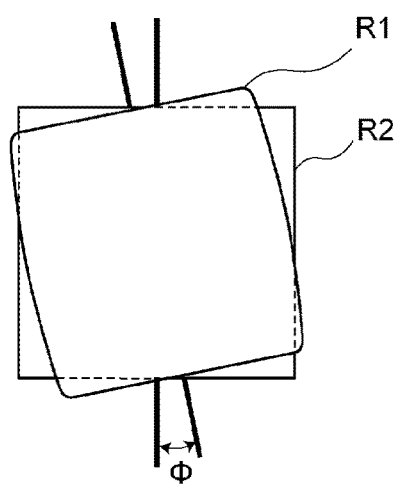
FIG. 11A is a plan view, as seen from above of FIG. 10A, and FIG. 11B pictorially illustrates a rolling surface of a roller R2.
Figure 11B:
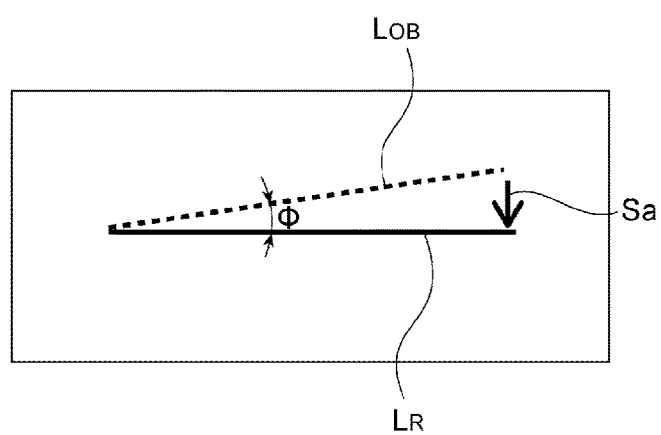

FIG. 10 pictorially illustrates a pair of rollers, FIG. 11A is a plan view, as seen from above of FIG. 10A, and FIG. 11B pictorially illustrates a rolling surface of a roller R2.

When one of a pair of rollers R1, R2 shown in FIG. 10 is rotatively driven by the other, a skew (an angle φ) may occur at the roller R1 with respect to the roller R2, as shown in FIG. 11A. At this time, as shown in FIG. 11B, the roller R1 intends to roll relative to the roller R2 along a direction of a locus $L_{OB}$ (an ideal rolling surface) shown with the broken line in FIG. 11B, i.e., in a direction inclined from a circumferential direction of the roller R2 by an angle φ.

However, since the axial position of the roller R1 is restrained, the roller R1 actually rolls with slipping on a locus $L_R$ (an actual rolling surface) denoted with the solid line in FIG. 11B along the circumferential direction of the roller R2. At this time, an axial slipping Sa corresponding to a slip ratio (:tan φ) occurs between the rollers R1, R2. For this reason, a traction force corresponding to the normal force between the pair of rollers R1, R2 is applied in the axial direction of the rollers R1, R2.

At this time, a skew force $F_{skew}$ can be expressed by an equation (1) of a traction coefficient μ and a normal force $F_c$.

[mathematical equation 1]

$$F_{skew} = \mu \cdot F_c \quad (1)$$

Figure 12:
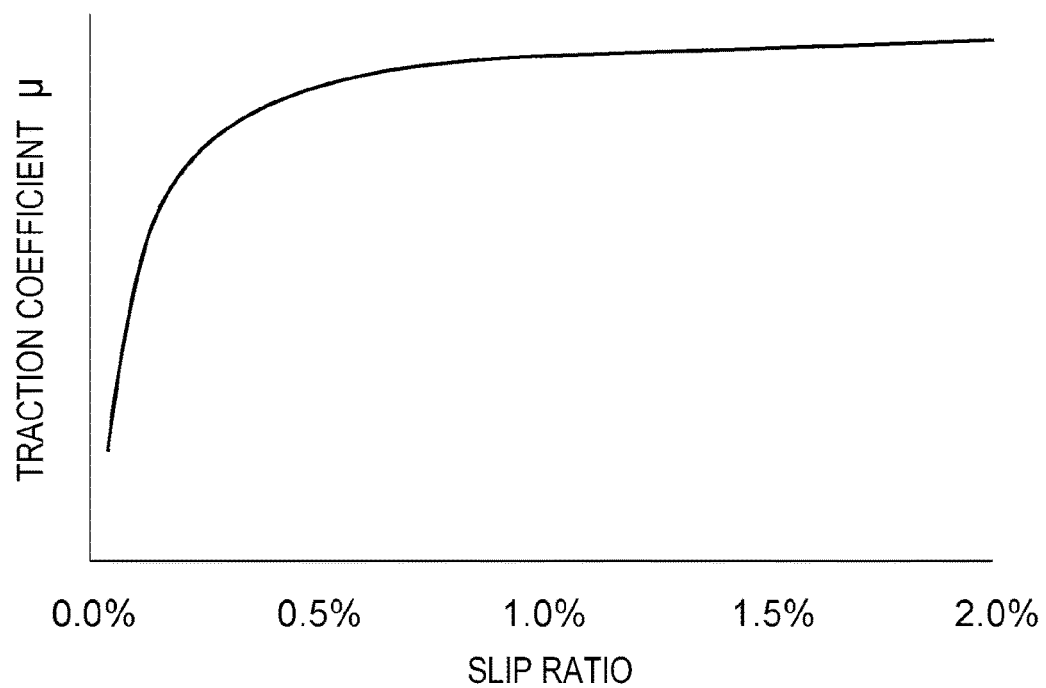
FIG. 12 is a graph depicting a correlation between a traction coefficient $\mu$ and a slip ratio of a traction surface.

The traction coefficient μ has a correlation with the slip ratio of the traction surface and generally has a characteristic as shown in FIG. 12. Considering the skew force, a horizontal axis of FIG. 12 corresponds to the slip ratio (:tan φ). From this, it can be seen that the greater the skew angle φ of the roller, the traction coefficient μ increases and the skew force $F_{skew}$ becomes higher.

Subsequently, a relation between the skew force $F_{skew}$ and the normal force $F_C$ of the traction surface is described.

Figure 13:
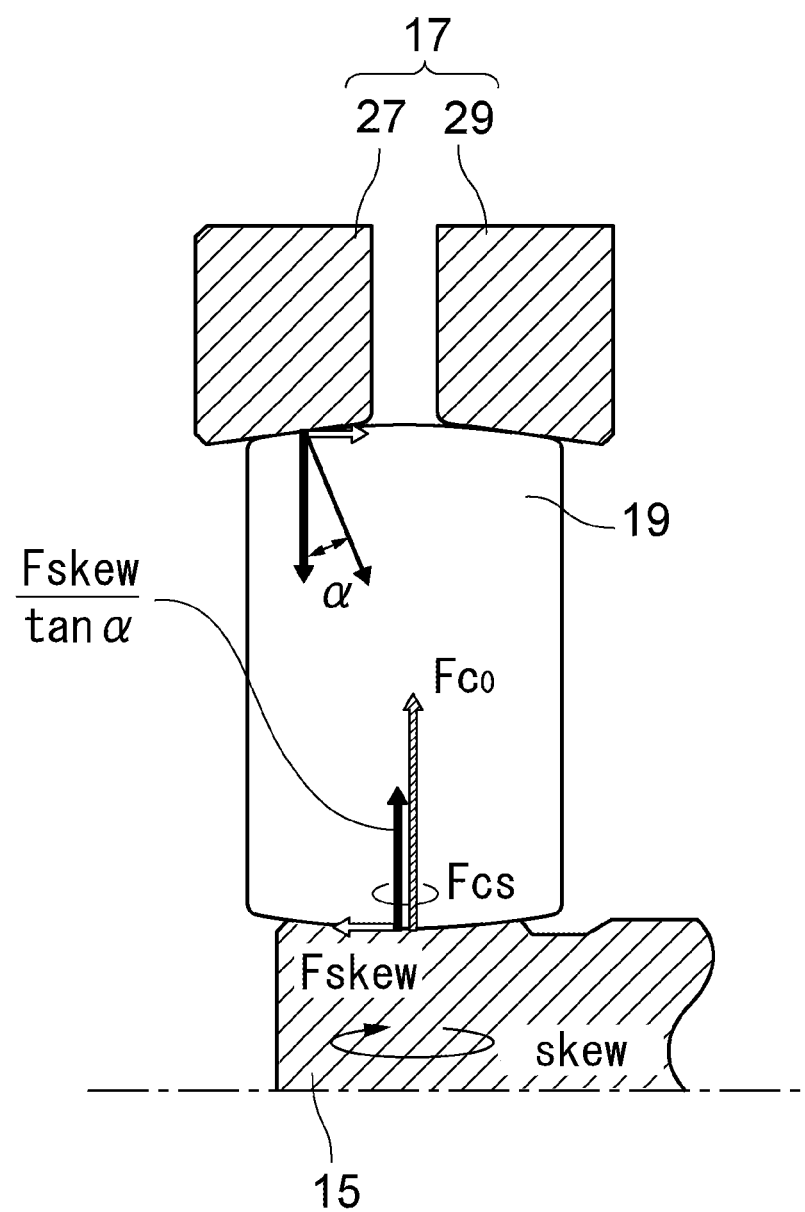
FIG. 13 illustrates a state where skew occurs at the intermediate roller and the sun roller when a ring roller-side is configured as a tapered surface and a sun roller-side is configured as a traction surface having no contact angle.

FIG. 13 illustrates a state where skew occurs at the intermediate roller 19 and the sun roller 15 when the ring roller 17-side is configured as a tapered surface and the sun roller 15-side is configured as a traction surface having no contact angle.

When an initial normal force between the sun roller 15 and the intermediate roller 19 is denoted as $F_{C0}$, the skew force between the sun roller 15 and the intermediate roller 19 is denoted as $F_{skew}$, and the inclination angle of the traction surface is denoted as $\alpha$, a normal force $F_{CS}$ between the sun roller 15 and the intermediate roller 19 is expressed by an equation (2).

[mathematical equation 2]

$$F_{CS} = F_{C0} + \frac{F_{skew}}{\tan\alpha} \quad (2)$$

Herein, when the number of the intermediate rollers 19 of the friction roller-type reduction gear 100 is denoted as n, the normal force $F_{CS}$ can be expressed by an equation (3) from the equation (2).

[mathematical equation 3]

$$F_{CS} = F_{C0} + n \cdot \frac{F_{skew}}{\tan\alpha} \quad (3)$$

From above, when the skew of the angle $\phi$ occurs at the intermediate roller 19, the normal force $F_{CS}(t)$ at any time t can be expressed by an equation (4) from the equations (1) and (3).

[mathematical equation 4]

$$F_{CS}(t) = F_{CS0} + \frac{n \cdot \mu \cdot F_{CS}(t - \Delta t)}{\tan\alpha} \quad (4)$$

$$F_{CS}(t) = F_{CS0} + \frac{n \cdot \mu}{\tan\alpha} \cdot F_{CS}(t - \Delta t)$$

From the equation (4), it can be seen that in case of $n\cdot\mu/\tan\alpha \geq 1$, when the skew occurs at the roller, the normal force $F_{CS}$ diverges. Under this condition, when the skew occurs once at the roller, the normal force Fcs increases at an accelerated pace by the skew force, and at worst, each traction component may be broken. In contrast, in case of $n\cdot\mu/\tan\alpha < 1$, even when the skew occurs at the roller, the normal force $F_{CS}$ converges into a relatively small value, so that it is possible to prevent the traction component from being broken.

In the below, a case where the skew occurs at the intermediate roller 19 and the ring roller 17 is described.

Figure 14:
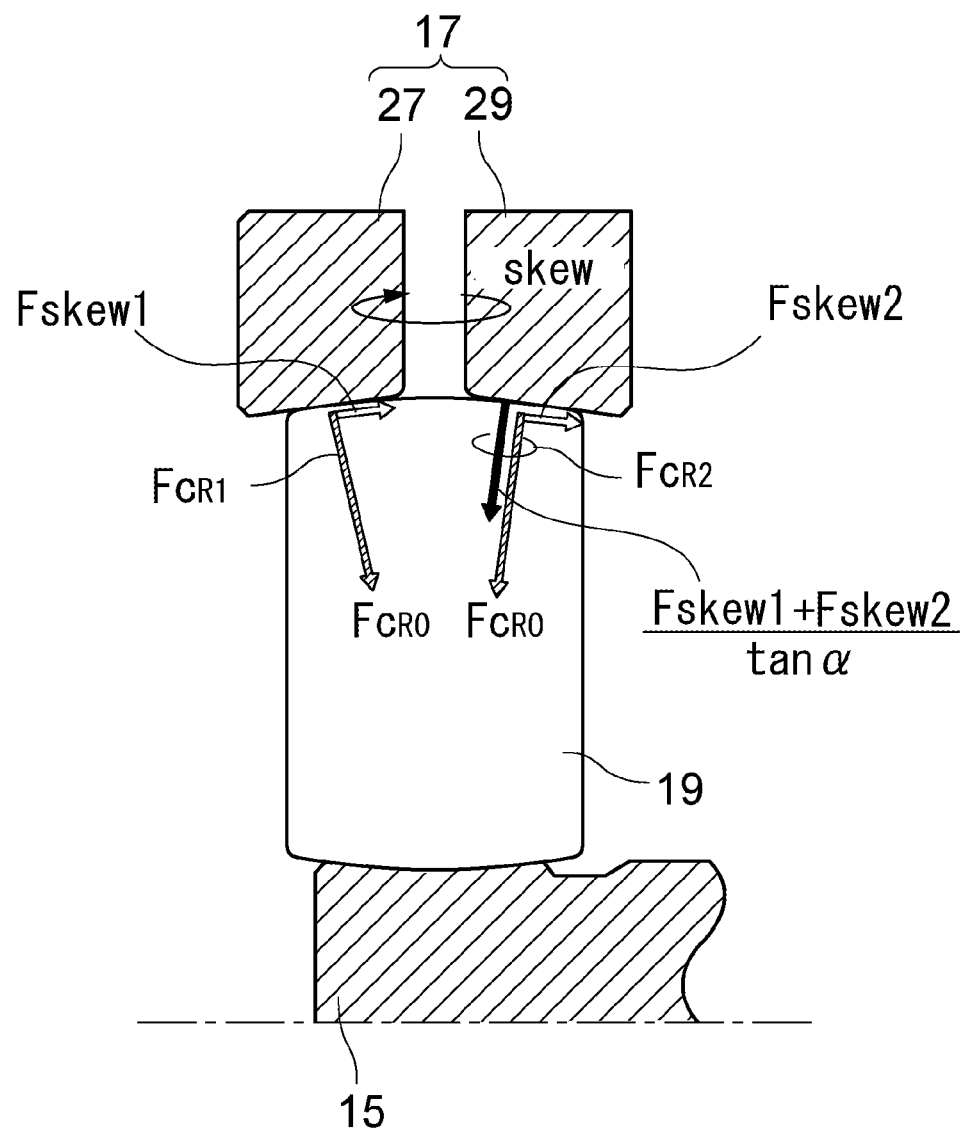
FIG. 14 illustrates a state where skew occurs at the intermediate roller and the ring roller when a ring roller-side is configured as a tapered surface and a sun roller-side is configured as a traction surface having no contact angle.

FIG. 14 illustrates a state where skew occurs at the intermediate roller 19 and the ring roller 17 when the ring roller 17-side is configured as a tapered surface and the sun roller 15-side is configured as a traction surface having no contact angle.

When an initial normal force between the ring roller 17 and the intermediate roller 19 is denoted as $F_{CR0}$, the skew forces between the pair of ring roller elements 27, 29 and the intermediate roller 19 are respectively denoted as $F_{skew1}$, $F_{skew2}$, and the inclination angle of the traction surface is denoted as $\alpha$, normal forces $F_{CR1}$, $F_{CR2}$ between the pair of ring roller elements 27, 29 and the intermediate roller 19 are respectively expressed by equations (5) and (6).

[mathematical equation 5]

$$F_{CR1} = F_{CR0} \quad (5)$$

$$F_{CR2} = F_{CR0} + \frac{F_{skew1} + F_{skew2}}{\tan\alpha} \quad (6)$$

Herein, when the number of the intermediate rollers 19 of the friction roller-type reduction gear 100 is denoted as n, the normal force $F_{CR2}$ can be expressed by an equation (7) from the equation (6).

[mathematical equation 6]

$$F_{CR2} = F_{CR0} + n \cdot \frac{F_{skew1} + F_{skew2}}{\tan\alpha} \quad (7)$$

From above, when the skew of the angle $\phi$ occurs at the intermediate roller 19, the normal force $F_{CR}(t)$ at any time t can be expressed by an equation (8) from the equations (1) and (7).

[mathematical equation 7]

$$F_{CR}(t) = F_{CR0} + n \cdot \frac{\mu \cdot F_{CR0} + \mu \cdot F_{CR}(t - \Delta t)}{\tan\alpha} \quad (8)$$

$$F_{CR}(t) = F_{CR0} + \frac{n \cdot \mu}{\tan\alpha} \cdot F_{CR0} + \frac{n \cdot \mu}{\tan\alpha} \cdot F_{CR}(t - \Delta t)$$

From the equation (8), it can be seen that when the skew occurs at the roller under condition of $n\cdot\mu/\tan\alpha \geq 1$, the normal force $F_{CR}$ diverges, like the case where the skew occurs between the sun roller 15 and the intermediate roller 19.

In FIGS. 12 and 13, the ring roller 17-side is a tapered surface and the sun roller 15-side is configured as a traction surface having no contact angle. However, the above conditions are also the same even when the sun roller 15-side is configured as a tapered surface and the ring roller 17-side is configured as a traction surface having no contact angle.

Herein, the above conditions are described with reference to specific numerical values. Here, in the friction roller-type reduction gear 100 having the three intermediate rollers 19, traction oil of a maximum traction coefficient $\mu_{max}=0.1$ is used.

The roller (the ring roller 17 in FIG. 1) having the loading cam mechanism is provided with a taper for converting the axial load into the normal force, and the inclination angle of the taper is denoted as $\alpha$.

In this case, $\tan\alpha > 0.3$ is obtained from $n\cdot\mu/\tan\alpha < 1$ (the convergence condition equation) and it can be seen that the inclination angle $\alpha$ should be designed to be greater than 16.7°.

In general, it has been known that a traction characteristic curve (refer to FIG. 12) of the traction oil changes depending on the contact surface pressure, the peripheral speed of the traction surface, the power to be transmitted, an oil temperature and the like. For this reason, the maximum traction coefficient $\mu_{max}$ is preferably a maximum value in a combination of the respective conditions.

In the below, a case where both the traction surfaces of the sun roller 15 and the ring roller 17 have the tapered surfaces is exemplified.

Figure 15:
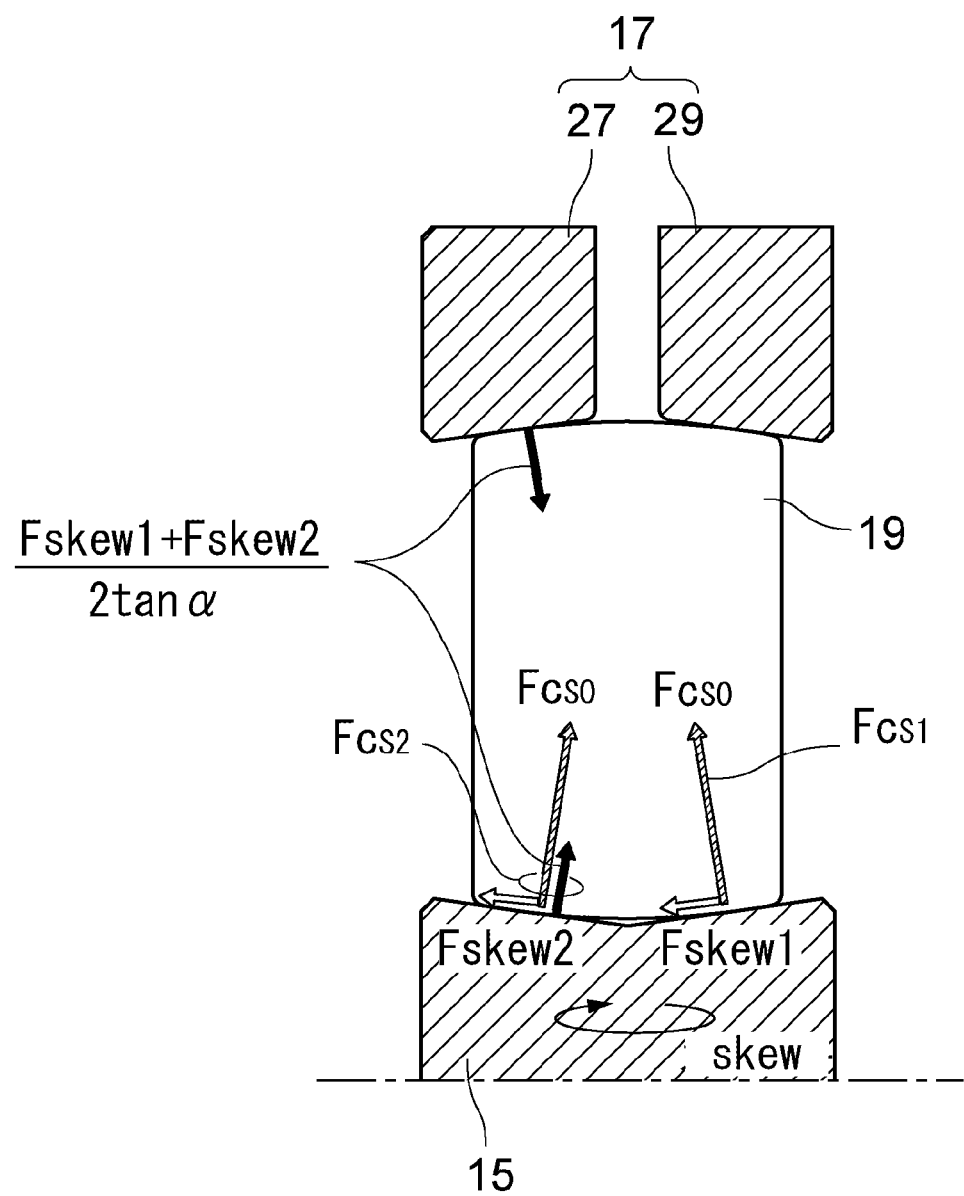
FIG. 15 illustrates a state where skew occurs at the intermediate roller and the sun roller when both traction surfaces of the sun roller and the ring roller are configured as tapered surfaces.

FIG. 15 illustrates a state where skew occurs at the intermediate roller 19 and the sun roller 15 when both the traction surfaces of the sun roller 15 and the ring roller 17 are configured as tapered surfaces.

When an initial normal force between the ring roller 17 and the intermediate roller 19 is denoted as $F_{CS0}$, the skew forces between the pair of ring roller elements 27, 29 and the intermediate roller 19 are respectively denoted as $F_{skew1}$, $F_{skew2}$, and the inclination angle of the traction surface is denoted as a, normal forces $F_{CS1}$, $F_{CS2}$ between the pair of ring roller elements 27, 29 and the intermediate roller 19 are respectively expressed by equations (9) and (10).

[mathematical equation 8]

$$F_{CS1} = F_{CS0} \quad (9)$$

$$F_{CS2} = F_{CS0} + \frac{F_{skew1} + F_{skew2}}{2\tan\alpha} \quad (10)$$

Herein, when the number of the intermediate rollers 19 of the friction roller-type reduction gear 100 is denoted as n, the normal force $F_{CS2}$ can be expressed by an equation (11) from the equation (10).

[mathematical equation 9]

$$F_{CS2} = F_{CS0} + n \cdot \frac{F_{skew1} + F_{skew2}}{2\tan\alpha} \quad (11)$$

From above, when the skew of the angle φ occurs at the intermediate roller 19, the normal force $F_{CS}(t)$ at any time t can be expressed by an equation (12) from the equations (1) and (11).

[mathematical equation 10]

$$F_{CS}(t) = F_{CS0} + n \cdot \frac{\mu \cdot F_{CS0} + \mu \cdot F_{CS}(t - \Delta t)}{2\tan\alpha} \quad (12)$$

$$F_{CS}(t) = F_{CS0} + \frac{n \cdot \mu}{2\tan\alpha} \cdot F_{CS0} + \frac{n \cdot \mu}{2\tan\alpha} \cdot F_{CS}(t - \Delta t)$$

From the equation (12), it can be seen that when the skew occurs at the roller under condition of n·μ/(2 tan α)≥1, the normal force $F_{CS}$ diverges. In contrast, even when the skew occurs at the roller under condition of n·μ/2(tan α)<1, since the normal force $F_{CS}$ converges within a predetermined value, the traction component is not broken.

<Support Form of Each Roller>

In the friction roller-type reduction gear 100 having the above configuration, for example, the axial positions of the sun roller and the intermediate roller may be mismatched due to the operation of the loading cam mechanism, misalignment of each roller or the skew. In this case, a center of the circular arc of the concave traction surface of the sun roller and a center of the circular arc of the convex traction surface of the intermediate roller do not coincide with each other, so that a contact angle is generated on the contact surface between the sun roller and the intermediate roller.

When the contact angle is generated on the contact surface between the rollers, the slipping in the contact surface increases, so that the torque transmission efficiency is lowered. Also, since an axially partial force of the normal force is generated on the contact surface, the normal forces of the respective traction surfaces are unbalanced. When the normal forces are unbalanced, the tangential forces on the contact surface are also unbalanced, so that a force of skewing the intermediate roller may be applied.

Therefore, one of the sun roller 15 configured to transmit the driving force from the input shaft 11 shown in FIG. 1 to the intermediate roller 19 and the ring roller 17 configured to transmit the driving force from the intermediate roller 19 to the output shaft 13 is configured to be rotatable axially and not to be displaceable axially and the other roller is configured to be rotatable axially and to be displaceable axially.

Figure 16:
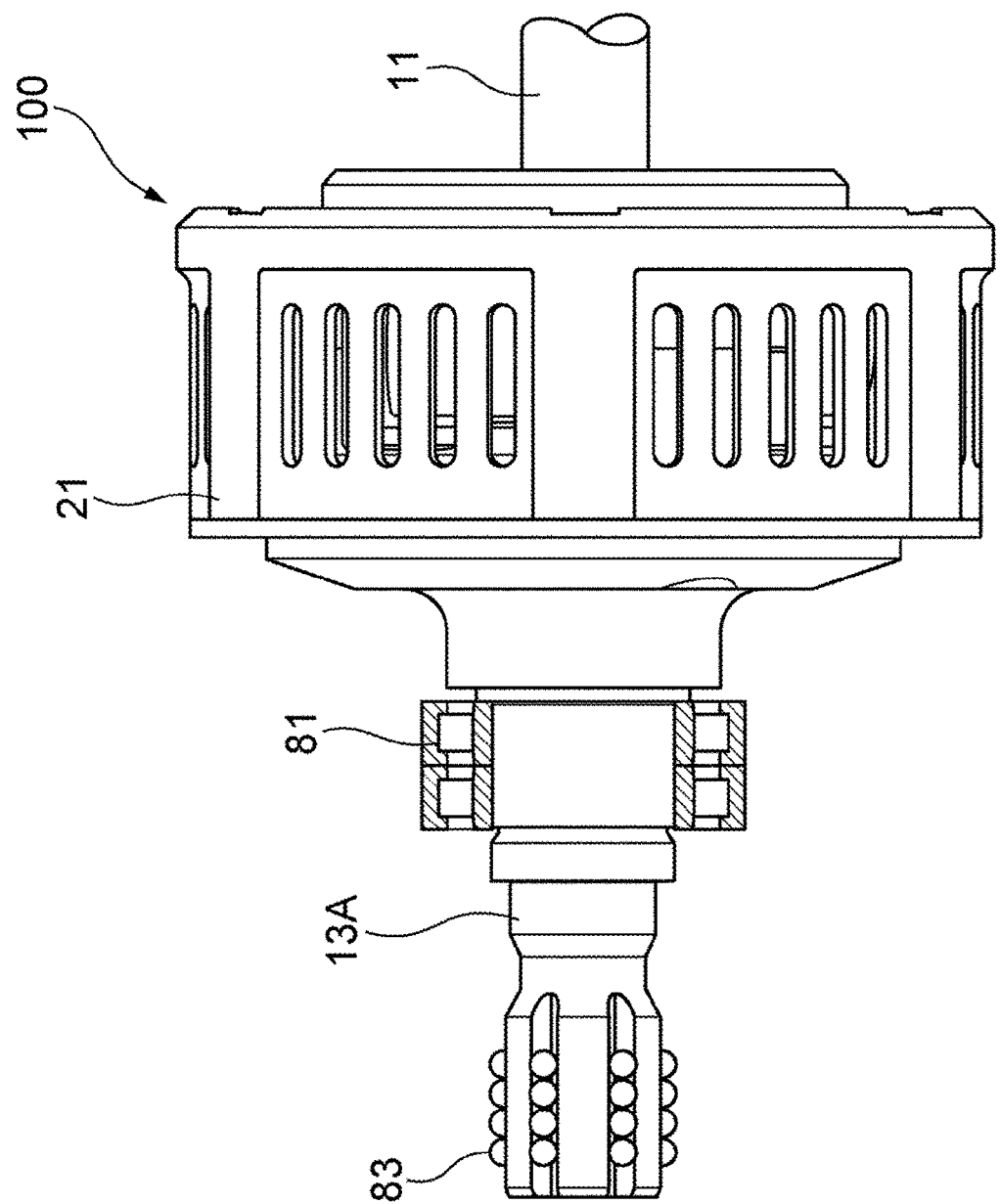
FIG. 16 is a front view of an output shaft support structure of the friction roller-type reduction gear.

A specific configuration example of the friction roller-type reduction gear and the output shaft is shown in FIG. 16. FIG. 16 is a front vie depicting an output shaft support structure of the friction roller-type reduction gear.

An output shaft 13A connected to the friction roller-type reduction gear 100 is rotatably supported to a housing (not shown) via a cylindrical roller bearing 81. The cylindrical roller bearing 81 is configured to support the output shaft 13A to be displaceable axially. Also, one end portion of the output shaft 13A opposite to the connection-side to the friction roller-type reduction gear 100 is provided with a torque transmission part 83 configured to transmit rotation torque to a member to be driven (not shown). As the torque transmission part 83, a ball spline capable of absorbing axial displacement of the output shaft 13A can be used.

As described above, the intermediate roller 19 is supported to be rotatable axially and to be displaceable axially by the needle bearing 22 (refer to FIG. 1).

As shown in FIG. 1, in the friction roller-type reduction gear 100 and the support structure of the output shaft 13A, the sun roller 15 connected to an input shaft 11A is supported to be rotatable axially and not to be displaceable axially. Also, the intermediate roller 19 and the moveable ring roller element 29 of the ring roller 17 are supported to be rotatable axially and to be displaceable axially.

According to the above configuration, when the moveable ring roller element 29 is axially displaced by the loading cam mechanism 23 of the friction roller-type reduction gear 100, the axial force is applied to the intermediate roller 19 and the sun roller 15 in connection with the axial movement. By the axial force, the intermediate roller 19 is axially displaced. On the other hand, since the sun roller 15 is supported not to be displaceable axially, the sun roller displaces the output shaft 13A in an opposite direction to the applying direction of the axial force to the sun roller 15.

Upon the displacement of the output shaft 13A, the axial displacement of the member to be driven is absorbed by the ball spline of the torque transmission part 83 provided at the output shaft 13A. For this reason, even when the intermediate roller 19 and the output shaft 13A are displaced axially, the member to be driven is not influenced by the axial displacement and the deviation of the contact point between the sun roller 15 and the intermediate roller 19 can be prevented.

Therefore, according to the above configuration, it is possible to prevent the competition of the rollers due to the misalignment of the roller and the skew, so that it is possible to improve the durability and the torque transmission efficiency of the friction roller-type reduction gear 100.

Figure 17:
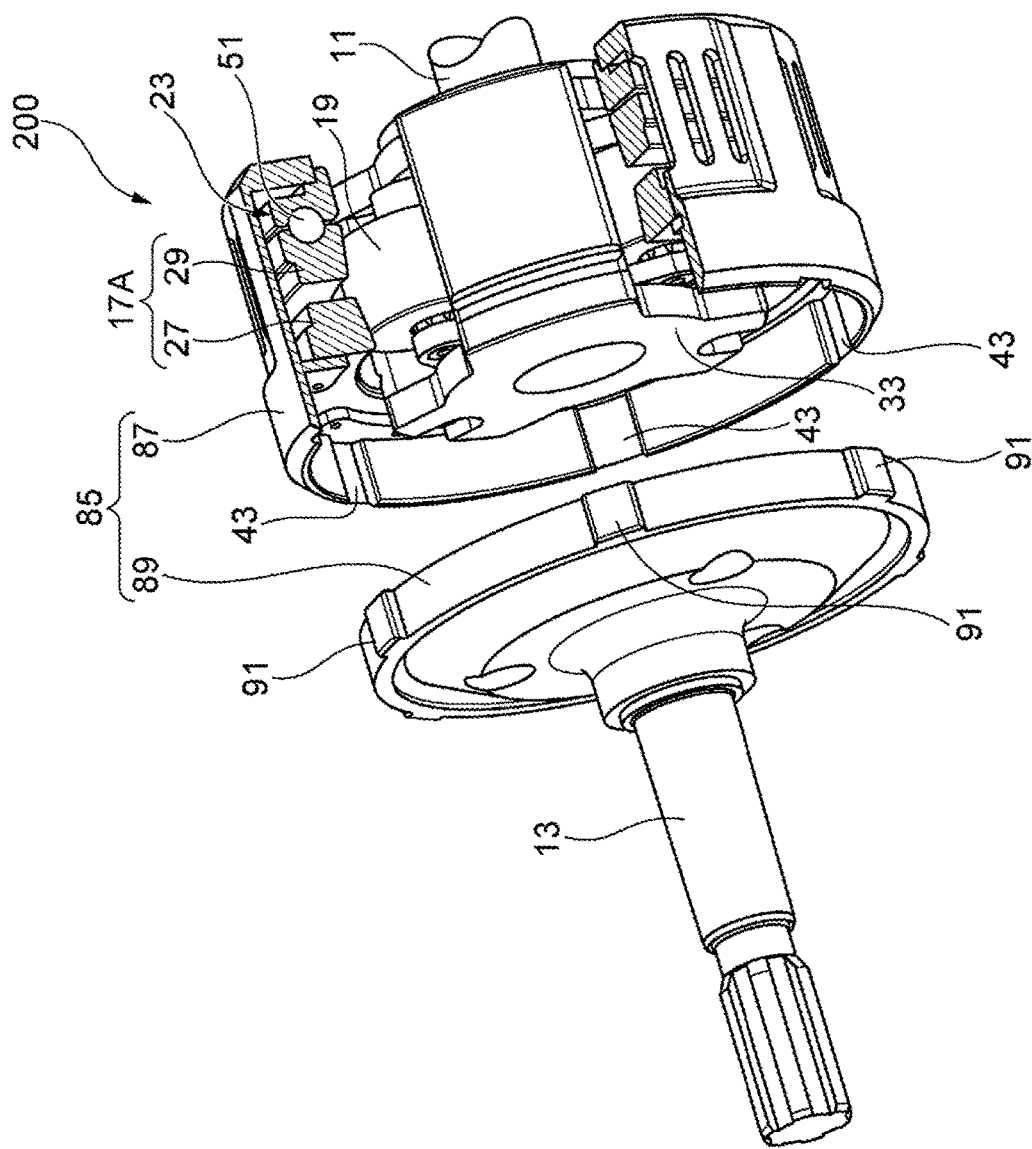
FIG. 17 is an exploded perspective view depicting another example of the output shaft support structure of the friction roller-type reduction gear.

FIG. 17 is an exploded perspective view depicting another example of the output shaft support structure of the friction roller-type reduction gear.

A friction roller-type reduction gear 200 of this configuration includes a sun roller (not shown) arranged concentrically with the input shaft 11, the ring roller 17A, the plurality of intermediate rollers 19, a coupling part 85 configured to couple the ring roller 17A and the output shaft 13 and the loading cam mechanism 23.

The ring roller 17A has the stationary ring roller element 27 and the moveable ring roller element 29 configured to be moveable axially. The ring roller elements 27, 29 are arranged concentrically with the sun roller and the input shaft 11 with being accommodated in a cylindrical ring roller accommodation part 87.

Also, a circular plate-shaped base end portion 89 is fixed to the output shaft 13. The ring roller accommodation part 87 and the base end portion 89 configure the coupling part 85.

An outer periphery of the base end portion 89 is formed with a plurality of projection claws 91 protruding radially outwards, like the stationary ring roller element 27 and the cam ring 49. The projection claws 91 are inserted into concave grooves 43 formed on an inner diameter surface of the ring roller accommodation part 87. The projection claw 91 in the concave groove 43 is engaged without rattling in the circumferential direction (rotating direction) and is also engaged to be slip-displaceable axially. Thereby, the ring roller accommodation part 87 and the base end portion 89 can transmit the rotation torque from the ring roller 17A to the output shaft 13.

That is, in the coupling part 85 of this configuration, the base end portion 89 provided at the output shaft 13-side and the ring roller accommodation part 87 provided at the ring roller 17A-side are configured as separate members. The torque is transmitted between the ring roller 17A and the output shaft 13 as the projection claws 91 of the base end portion 89 and the concave grooves 43 of the ring roller accommodation part 87 are engaged with each other and the base end portion 89 and the ring roller accommodation part 87 are integrally rotated.

In the above configuration, the ring roller 17A and the intermediate roller 19 are supported to be rotatable axially and to be displaceable axially, and the sun roller (not shown) is supported to be rotatable axially and not to be displaceable axially. Thereby, when the moveable ring roller element 29 is axially displaced and the axial force is thus applied to the intermediate roller 19 and the sun roller, the intermediate roller 19 is axially displaced. On the other hand, the sun roller cannot move axially even when the axial force is applied thereto. For this reason, the intermediate roller 19, the ring roller 17A and the ring roller accommodation part 87 around the sun roller are displaced in an opposite direction to the applying direction of the axial force.

That is, the concave groove 43 of the ring roller accommodation part 87 and the projection claw 91 of the base end portion 89 are relatively displaced axially by the axial force. As a result, the displacement caused due to the generated axial force is absorbed, so that it is possible to suppress the deviation of the contact point of the sun roller and the intermediate roller 19. Also, in this configuration, since the output shaft 13 is not displaced axially, unlike the configuration of FIG. 16, it is not necessary to provide the output shaft 13 with the complex torque transmission part such as the ball spline.

Also, since the coupling part 85 has a large diameter, the load to be applied to the projection claw 91 and the concave groove 43 is relatively small. For this reason, the projection claw 91 and the concave groove 43 are not required to have the particularly high member strength. Also, the concave grooves 43 are commonly used to the grooves to which the projections 28, 61 of the stationary ring roller element 27 and the cam ring 49 (refer to FIG. 1) are engaged. Thereby, when manufacturing the friction roller-type reduction gear, it is possible to reduce the processing man-hour, so that it is possible to save the cost of the reduction gear.

In the configurations of the friction roller-type reduction gears shown in FIGS. 16 and 17, the intermediate roller 19 and the moveable ring roller element 29 are supported to be displaceable axially. However, the combination of the axially displaceable rollers is not limited thereto.

However, since the rotating speed of the sun roller is higher than the other rollers, it is necessary to favorably balance the rotating speeds of the respective rollers. In this case, preferably, the intermediate roller 19 and the moveable ring roller element 29 are configured to be displaceable axially and the sun roller 15 is configured not to be displaceable axially. According to this configuration, it is not necessary to provide the complex structure such as the ball spline for the input shaft 11 of the sun roller 15-side configured to rotate at high speed.

Second Configuration Example

Subsequently, a second configuration example of the friction roller-type reduction gear is described.

<Support Form of Intermediate Roller to Carrier>

Figure 18:
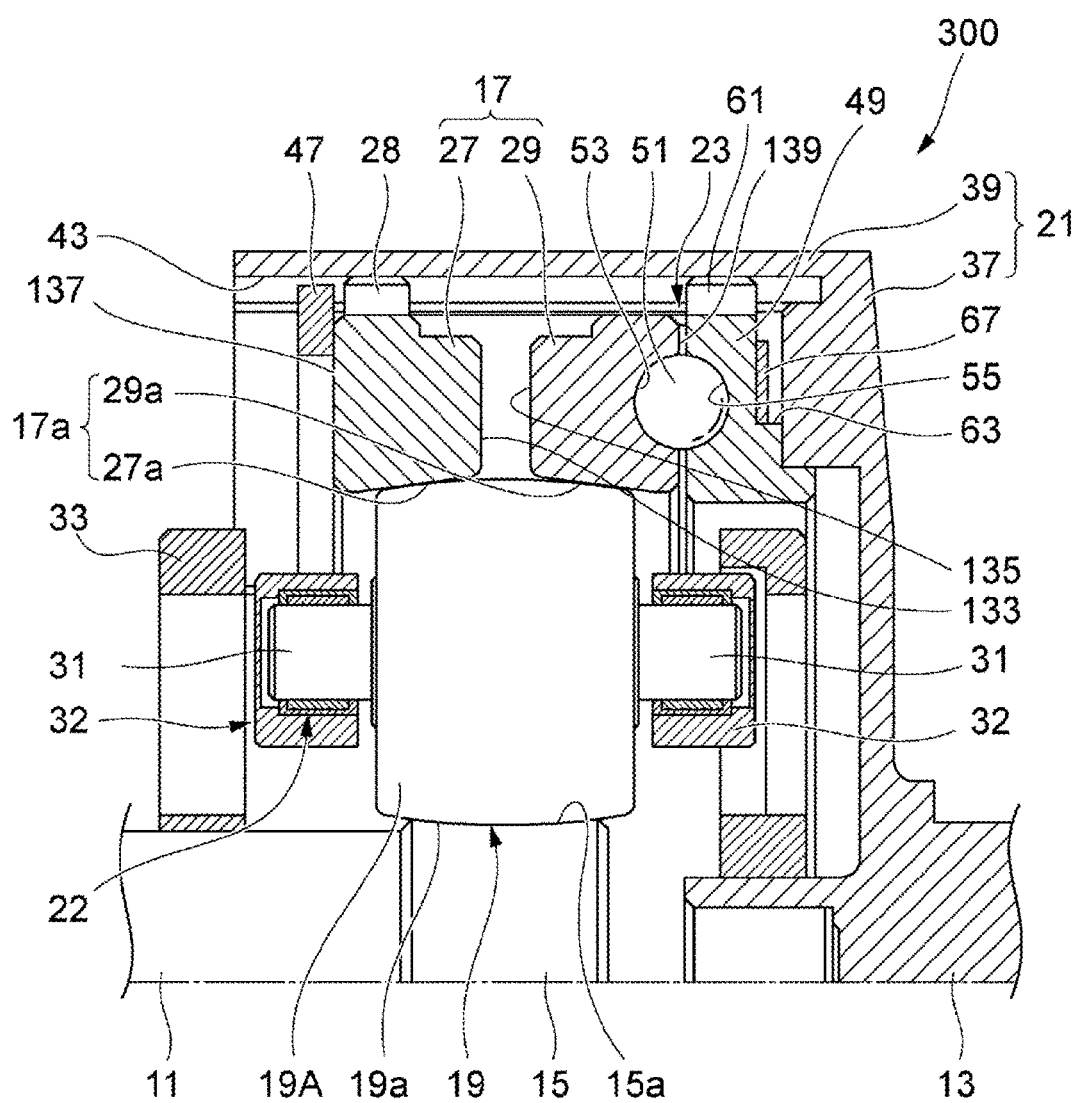
FIG. 18 is an enlarged sectional view of main parts of a friction roller-type reduction gear in accordance with a second configuration example.

A friction roller-type reduction gear of a second configuration example is basically similar to the configuration shown in FIG. 1. Herein, a support form of the intermediate roller 19 is described. FIG. 18 is an enlarged sectional view of main parts of a friction roller-type reduction gear 300 in accordance with a second configuration example, and FIG. 19 is a partially sectional perspective view of a swinging holder 32 configured to support the intermediate roller 19.

Figure 19:
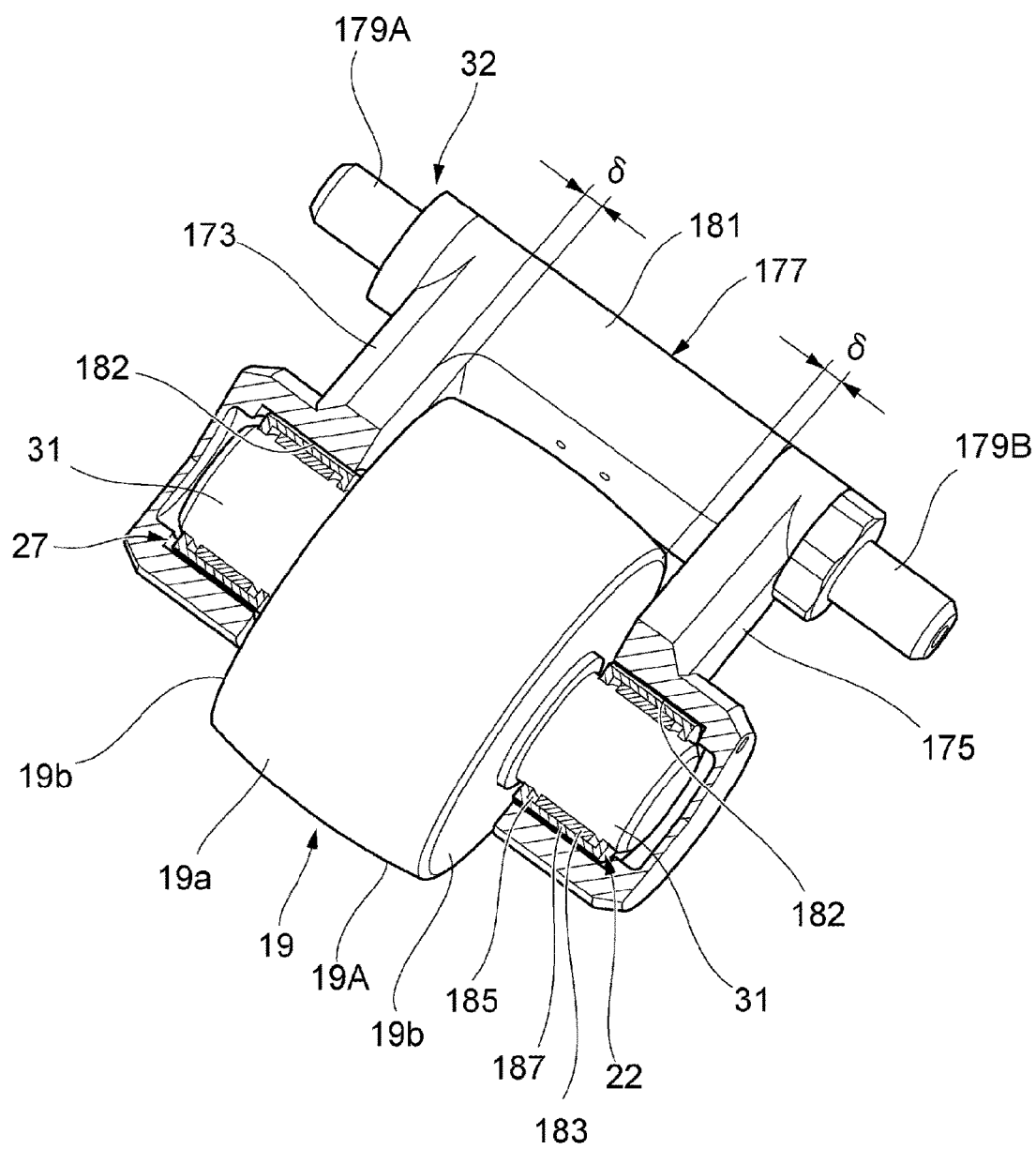
FIG. 19 is a partially sectional perspective view of a swinging holder configured to support the intermediate roller.

As shown in FIGS. 18 and 19, the intermediate roller 19 has a roller main body 19A having an outer peripheral surface 19a becoming a traction surface and a pair of support shafts 31, 31 extending axially from end faces 19b, 19b of both end portions of the roller main body 19A. The intermediate roller 19 is a solid member in which the roller main body 19A and the pair of support shafts 31, 31 are integrally formed.

The pair of support shafts 31, 31 is supported to arm parts 173, 175 of the swinging holder 32 via each of the needle bearings 22.

The swinging holder 32 has a configuration where two components of a main body part 177 having one arm part 173 and the other arm part 175 are coupled using a screw provided for a swinging shaft 179B.

The main body part 177 has the arm part 173 and a base part 181 to which a base end-side of the arm part 173 is connected. The base part 181 is formed therein with swinging shaft holes (which will be described later) to which swinging shafts 179A, 179B are to be inserted.

The arm parts 173, 175 are formed at tip ends thereof with shaft holes 182 configured to face each other and to accommodate therein the support shaft 31 of the intermediate roller 19. The shaft hole 182 is configured as a blind hole of which one end is closed. The support shaft 31 of the intermediate roller 19 is supported to the shaft hole 182 via the needle bearing 22.

The needle bearing 22 is a shell-type needle bearing or a solid-type needle bearing having a needle roller 183, a retainer 185 and an outer ring 187. The needle bearing 22 is configured to support the intermediate roller 19 to be rotatable and to be moveable axially.

As shown in FIG. 1, the swinging holder 32 having the above configuration is arranged so that the support shafts 31, 31 are parallel with the input shaft 11. Also, the swinging holder 32 is supported to the carrier 33 so that the intermediate roller 19 is to be moveable (swingable) in the radial direction of the input shaft 11.

Figure 20:
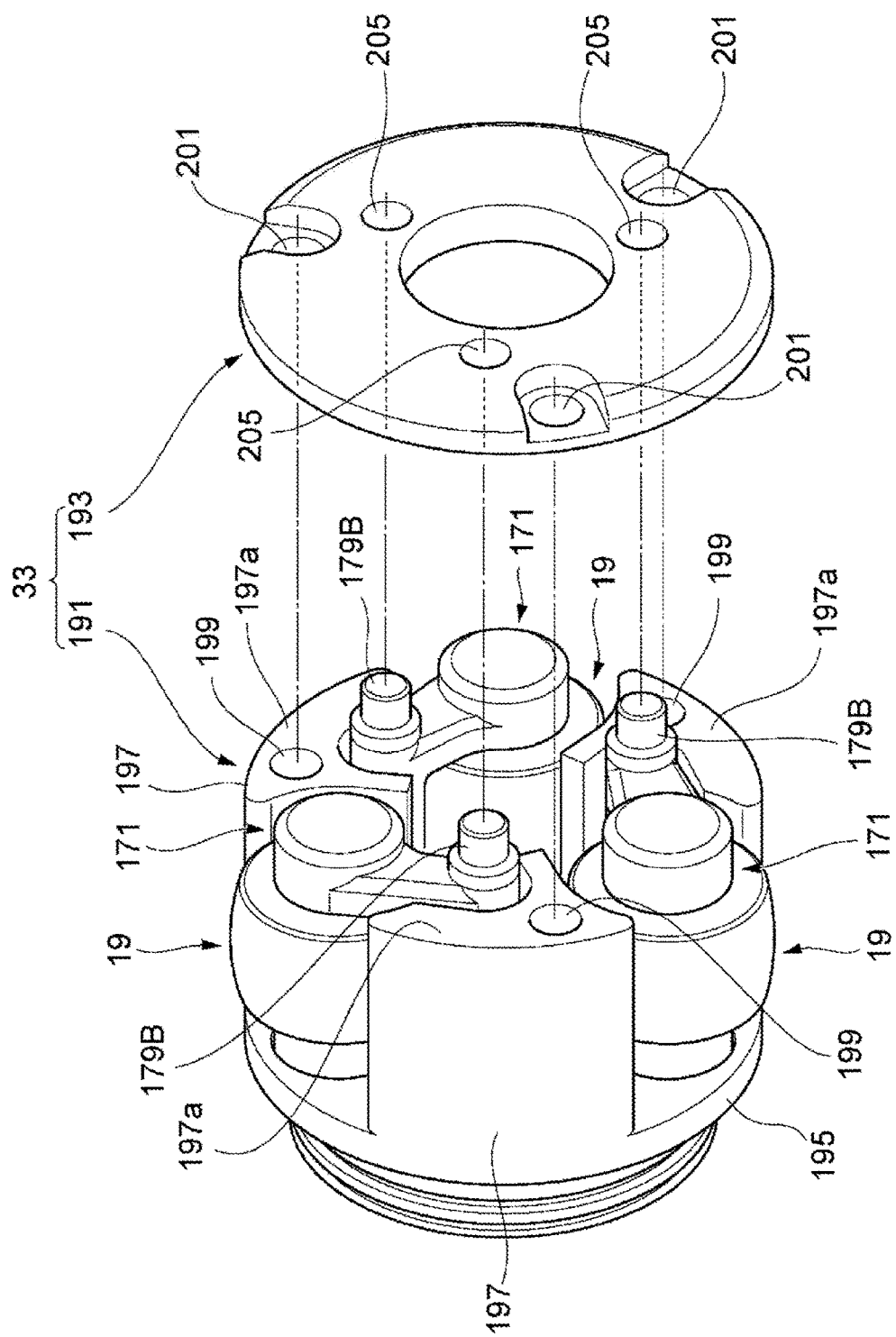
FIG. 20 is an exploded perspective view of a carrier.

FIG. 20 is an exploded perspective view of the carrier 33. The carrier 33 has a carrier main body 191 and a circle ring-shaped coupling plate 193 fixed to one end-side of the carrier main body 191. The carrier main body 191 has a circle ring-shaped bottom part 195 and column parts 197 provided to stand up at a plurality of places (three places, in the shown example) equidistantly spaced in a circumferential direction of the bottom part 195. The coupling plate 193 is fixed to tip portions 197a of the column parts 197.

The column parts 197 and the coupling plate 193 are formed with bolt insertion holes 199, 201 penetrating axially. The carrier main body 191 is fixed to a motor main body (not shown) by a fastening member such as bolts to be inserted into the bolt insertion holes 199, 201.

The swinging holder 32 configured to support the intermediate roller 19 is arranged between the column parts 197 aligned in the circumferential direction. One swinging shaft 179B of the swinging holder 32 is inserted into a shaft hole 205 formed in the coupling plate 193. Also, the other swinging shaft (the swinging shaft 179A in FIG. 19) is inserted into a shaft hole (not shown) formed in the bottom part 195 of the carrier main body 191. Thereby, the intermediate roller 19 is pivotally supported to be swingable about the swinging shafts 179, 179B, so that the intermediate roller 19 can be advanced and retreated in the radial direction of the carrier 33.

As described above, the swinging holders 32 are independently provided for the plurality of intermediate rollers 19, respectively, and one intermediate roller 19 is supported to each of the swinging holders 32.

<Axial Displacement of Intermediate Roller>

Subsequently, the axial displacement of the intermediate roller 19 is described.

As shown in FIGS. 1 and 18, in the friction roller-type reduction gear 300 of the second configuration example, the loading cam mechanism 23 is arranged on only an outer end face-side of one axially outer ring roller element of the ring roller elements 27, 29. The loading cam mechanism 23 is configured to displace the moveable ring roller element 29 towards the stationary ring roller element 27, in correspondence to the rotation torque from the input shaft 11. Thereby, the axial force is applied to the intermediate roller 19.

The intermediate roller 19 is axially slid by the applied axial force. The slide operation is implemented by the needle bearing 22. The needle bearing 22 enables the smooth slide operation with a low resistance without disturbing the axial displacement of the intermediate roller 19. Thereby, when the intermediate roller 19 is applied with the axial force from the loading cam mechanism 23, the intermediate roller smoothly slides to suppress wear and friction. Thereby, it is possible to prevent the surface pressures of the respective traction surfaces from being non-uniform.

In the meantime, the intermediate roller 19 is supported to the swinging holder 32 to be moveable axially. Gaps δ are respectively formed between the one and other end faces 19b of the roller main body 19A and the holder inner surface of the swinging holder 32, i.e., between the end face 19b and the facing inner surfaces of the arm parts 173, 175. By the gaps δ, the intermediate roller 19 can move axially.

<Structure of Swinging Holder>

Figure 21:
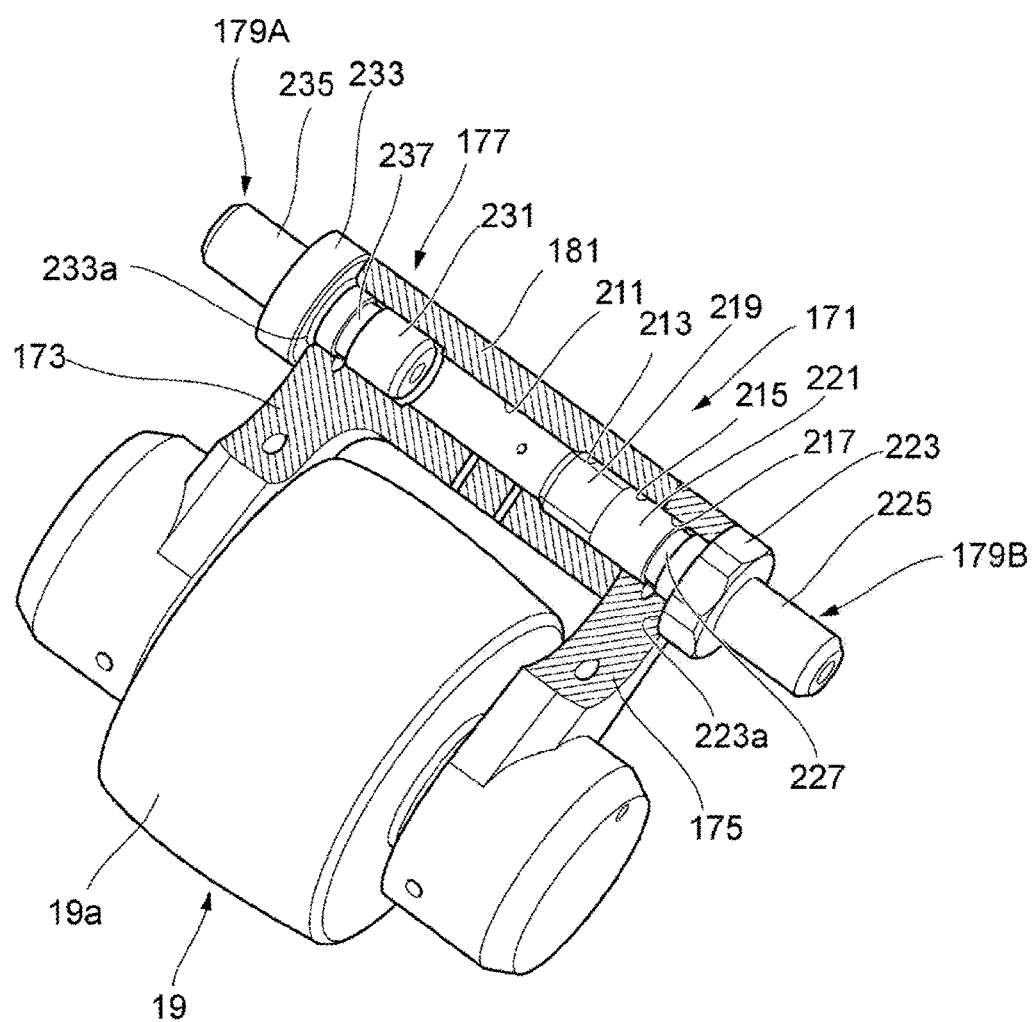
FIG. 21 is a partially sectional perspective view of the swinging holder configured to support the intermediate roller.

Subsequently, the configuration of the base part 181 of the swinging holder 32 is described in more detail. FIG. 21 is a partially sectional perspective view of the swinging holder 32 configured to support the intermediate roller 19.

The main body part 177 and the arm part 175 of the swinging holder 32 are coupled by the swinging shaft 179B. The base part 181 of the swinging holder 171 is formed with a swinging shaft hole 211 to which the swinging shafts 179A, 179B are to be mounted.

The base part 181 has a female screw portion 213 and a large-diameter portion 215 formed in the swinging shaft hole 211. The arm part 175 is formed with a swinging shaft hole 217 having the same diameter as the large-diameter portion 215.

The swinging shaft 179B to be inserted into the swinging shaft holes 211, 217 has a male screw portion 219 for coupling, a positioning portion 221, a flange portion 223 and an engaging shaft 225 to be inserted into the swinging shaft hole 211 of a carrier 189, in order from an insertion tip end-side to the base part 181.

The swinging shaft 179B is inserted into the swinging shaft hole 211 of the base part 181 through the swinging shaft hole 217 of the arm part 175, and the male screw portion 219 formed at the tip end thereof is screwed with the female screw portion 213. The swinging shaft 179B is fixed at a state where one end face of the flange portion 223 is contacted to the arm part 175 and both are fastened by screwing the screws.

At this time, the positioning portion 221 is fitted to the large-diameter portion 215 and the swinging shaft hole 217, so that the base part 181 and the arm part 175 are positioned. That is, the positioning portion 221 of the swinging shaft 179B and the large-diameter portion 215 and swinging shaft hole 217 have a spigot connection function. A part of the positioning portion 221 of the swinging shaft 179 is formed with an annular groove 227 becoming an oil passage (which will be described later).

The swinging shaft 179A has a positioning portion 231, a flange portion 233 and an engaging shaft 235 to be inserted into the shaft hole of the carrier 189, in order from an insertion tip end-side to the base part 181. A part of the positioning portion 231 is formed with an annular groove 237 becoming an oil passage (which will be described later).

<Operational Effects by Support Structure of Intermediate Roller>

According to the support structure of the intermediate roller 19, following operational effects are accomplished.

As shown in FIG. 19, the needle bearings 22 configured to support the intermediate roller 19 are arranged on both side surfaces of the traction surface, so that the needle bearings 22 are not influenced by the elastic deformation of the intermediate roller 19. Therefore, even when the normal force is applied to the intermediate roller 19, the bearing internal gap of the needle bearing 22 is not reduced. Thereby, it is possible to improve the durability life of the needle bearing 22.

Also, the occurrence of the axial load caused due to the skew of the needle bearing 22 is reduced. Also, since the intermediate roller 19 is supported at both sides thereof, a support span increases, as compared to a configuration where the intermediate roller is supported on an inner periphery of the roller main body 19A. As a result, the relative skew between the needle bearing 22 and the intermediate roller 19 is difficult to occur.

Also, since the intermediate roller 19 has the solid structure where the roller main body 19A and the support shaft 31, 31 are integrated, it is possible to improve the stiffness. Thereby, the elastic deformation amount, which is caused due to the normal force, is reduced, as compared to a hollow structure, and the axial displacement of the intermediate roller 19 due to the axial thrust from the moveable ring roller element 29 is suppressed.

Also, it is possible to easily correct the balance of the intermediate roller 19, to prevent the abnormal vibrations due to the deviation of a center of gravity and to implement the stable high-speed rotation. Also, the resonance frequency of the intermediate roller 19 is increased as the stiffness is improved, so that the abnormal vibrations due to the resonance are reduced. The above operational effects accomplished by the solid structure of the intermediate roller 19 are also the same for the sun roller 15.

Figure 22:
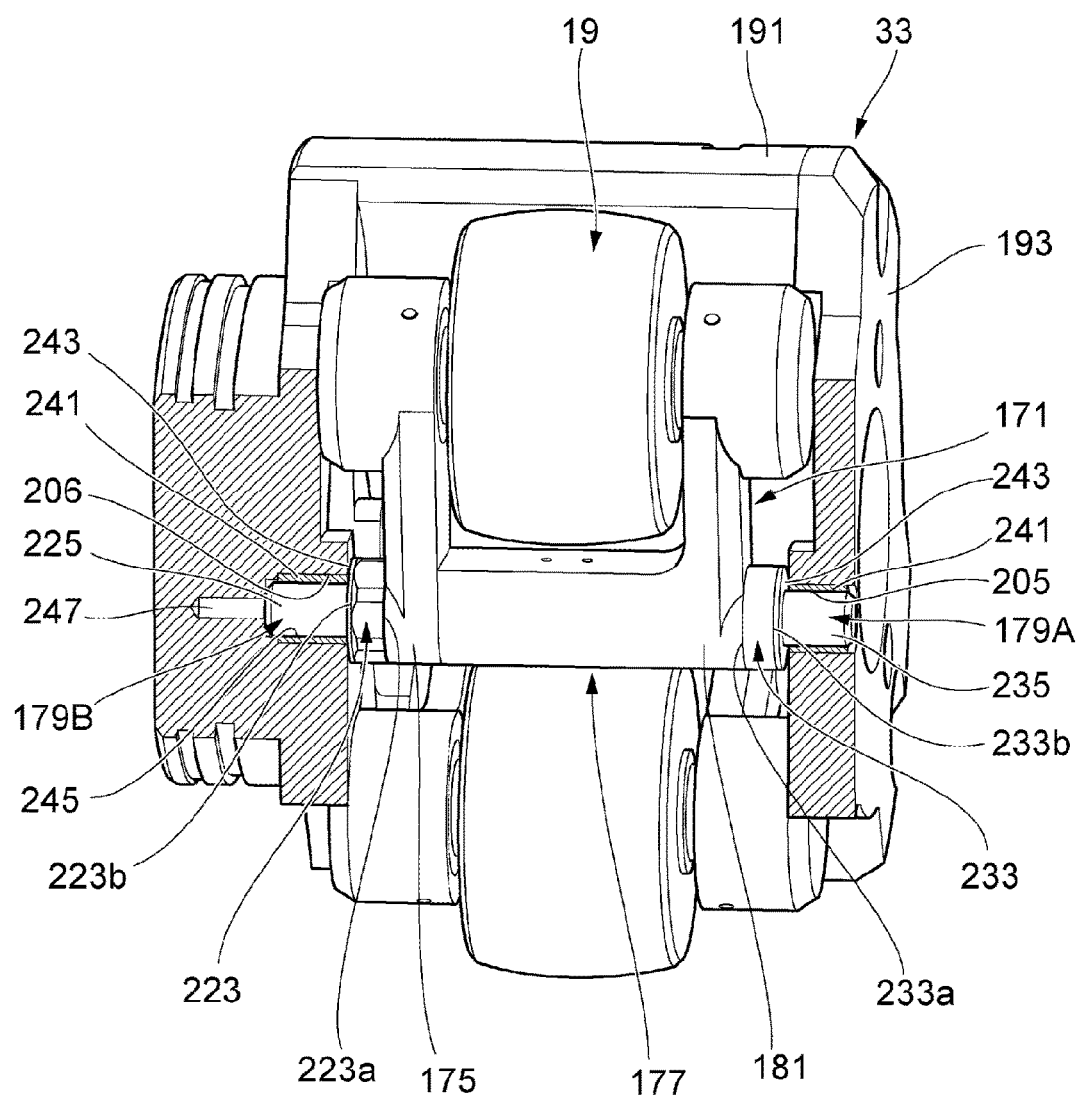
FIG. 22 is a partially sectional perspective view of the carrier to which the swinging holder is supported.

FIG. 22 is a partially sectional perspective view of the carrier 33 to which the swinging holder 32 is supported. One end face 233a of the flange portion 233 of the swinging shaft 179A functions as a seat surface upon fastening of the swinging shaft 179A. The other end face 233b becomes a contact surface with the coupling plate 193 of the carrier 33. The shaft hole 205 of the coupling plate 193 is mounted with a slipping bush 241, and the engaging shaft 235 of the swinging shaft 179A is inserted into the slipping bush 241. The engaging shaft 235 is mounted with a washer 243 between the flange portion 233 and the coupling plate 193.

Also, one end face 223a of the flange portion 223 of the swinging shaft 179B functions as a seat surface upon fastening of the swinging shaft 179B. The other end face 223b becomes a contact surface with the carrier main body 191 of the carrier 33. The engaging shafts 225, 235 of the swinging shafts 179A, 179B are mounted with the slipping bush 241 and the washer 243 therebetween.

According to the above configuration, the flange portions 233, 223 are sandwiched to the carrier 33. For this reason, even though the screws of the swinging shafts 179A, 179B are unfastened, for example, the swinging shafts 179A, 179B are not separated from the shaft holes 205, 206 and the swinging holder 32 is not disassembled.

<Oil Passage to Support Bearing of Intermediate Roller>

Subsequently, an oil passage for supplying lubricating oil to the support bearing of the intermediate roller 19 is described.

Since the intermediate roller 19 is configured to be rotatively driven at high speed, the oil should be supplied thereto. However, when the axial force is applied to the intermediate roller 19, an oil supply position may deviate from a target position due to the axial displacement of the intermediate roller 19. Therefore, the intermediate roller 19 is preferably provided with a separate oil passage for oil supply so as to securely supply the oil to the intermediate roller 19. However, the oil passage structure corresponding to the axial movement becomes complicated, so that the manufacturing cost and the maintenance cost of the device increase.

In the friction roller-type reduction gear 300 of the second configuration example, the intermediate roller 19 is supported to be moveable axially by the needle bearing 22. Even with this configuration, it is possible to supply an appropriate amount of the lubricating oil to an appropriate supply position without complicating the supply oil passage of the lubricating oil.

Figure 23:
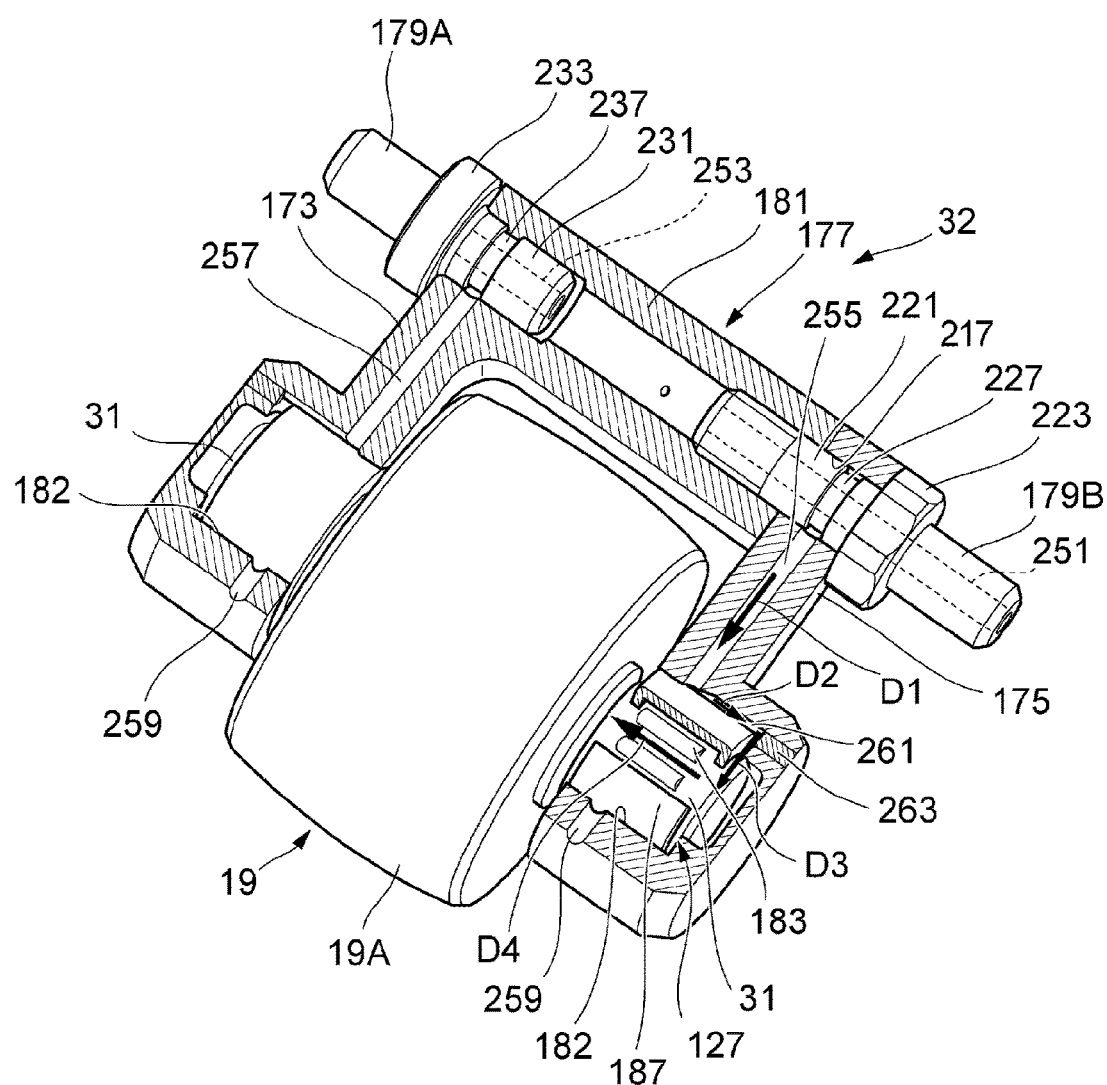
FIG. 23 is a partially sectional perspective view depicting the swinging holder, taken along a plane including a central axis of a swinging shaft.

FIG. 23 is a partially sectional perspective view depicting the swinging holder 32, taken along a plane including central axes of the swinging shafts 179A, 179B. A lubricating oil supply path 247 (refer to FIG. 22) formed in the carrier 33 is configured to supply the lubricating oil to the swinging shaft 179B. As shown in FIG. 23, the swinging shafts 179A, 179B are formed in the inner diameter portions of the shaft holes 251, 253 becoming the oil passage.

The lubricating oil is supplied to oil passages 255, 257 formed in the arm parts 173, 175, through the shaft holes 251, 253.

Specifically, a part of the lubricating oil supplied to the shaft hole 251 of the swinging shaft 179B is supplied into the annular groove 227 formed in a part of the positioning portion 221, through an opening hole (not shown). Likewise, the lubricating oil is supplied into the annular groove 237 formed in the positioning portion 231 of the swinging shaft 179A.

The lubricating oil in the annular groove 227 is sent to the shaft hole 182 configured to support the needle bearing 22, through the oil passage 255 formed in the arm part 175 (refer to an arrow D1 in FIG. 23). Also, the lubricating oil in the annular groove 237 is sent to the shaft hole 182 of the arm part 173-side, through the oil passage 257 formed in the arm part 173.

Figure 24:
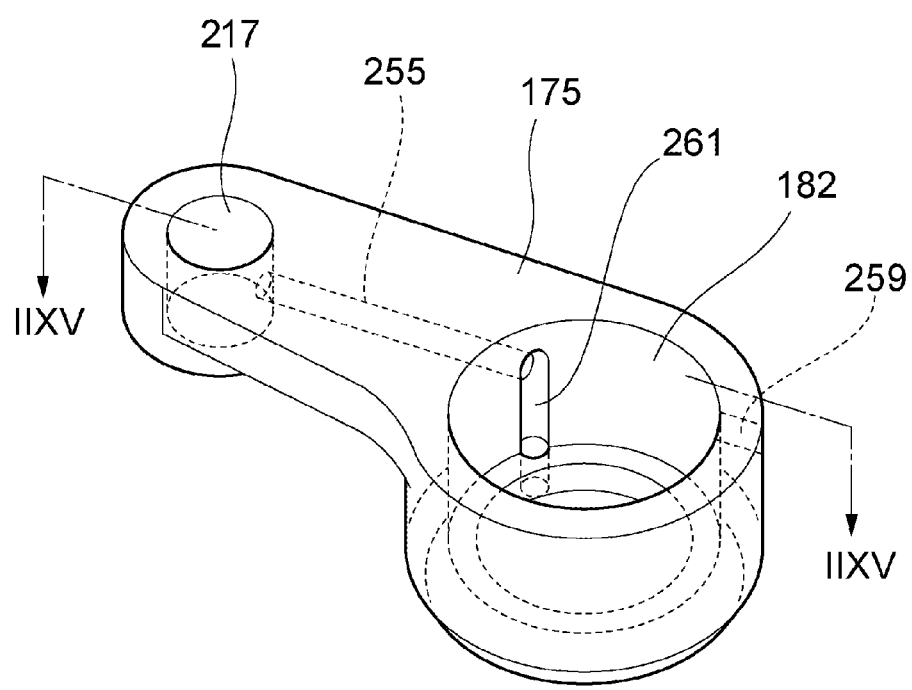
FIG. 24 is a perspective view of a single body of an arm part.
Figure 25:
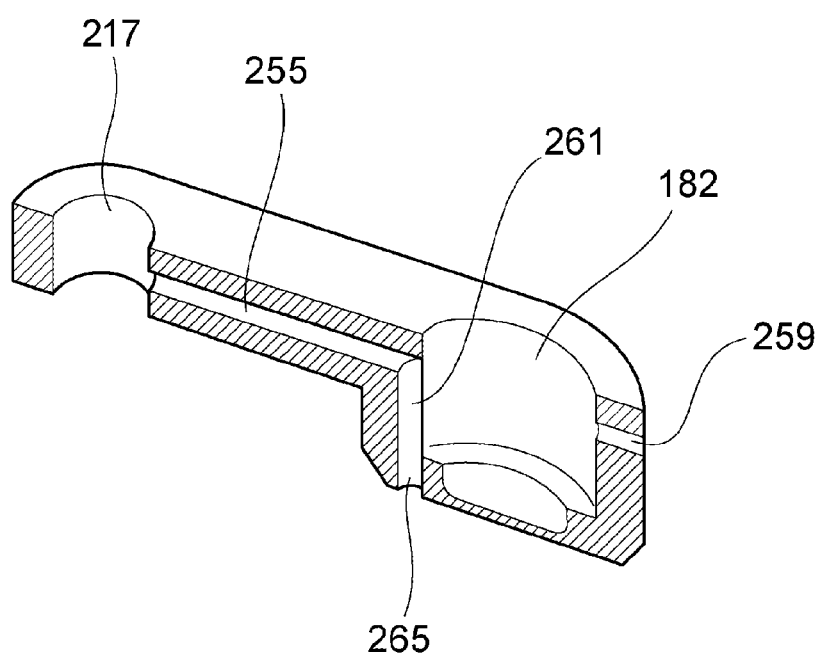
FIG. 25 is a sectional perspective view taken along a line IIXV-IIXV of FIG. 24.
Figure 26:
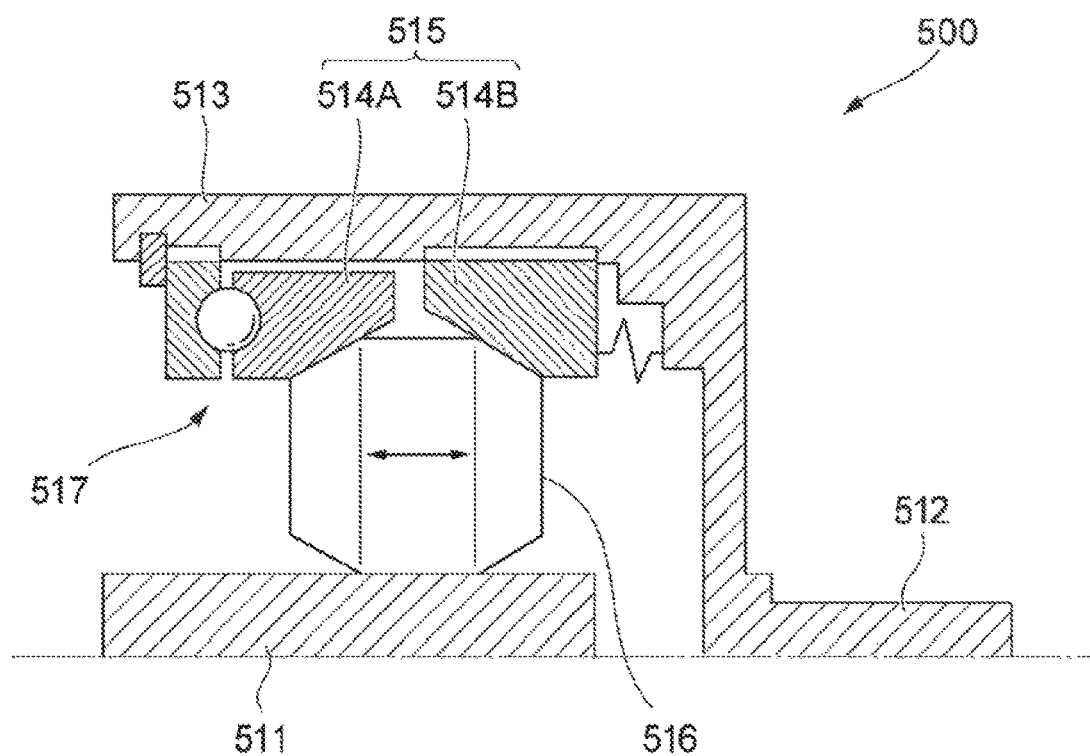
FIG. 26 is a sectional view of main parts of a friction roller-type reduction gear of the related art.

FIG. 24 is a perspective view of a single body of the arm part 175, and FIG. 25 is a sectional perspective view taken along a line IIXV-IIXV of FIG. 24. The arm part 175 is formed with the swinging shaft hole 217 into which the swinging shaft 179B (refer to FIG. 23) is inserted, the shaft hole 182 configured to support the needle bearing 22 (refer to FIG. 23) and the oil passage 255 configured to communicate the swinging shaft hole 217 and the shaft hole 182.

The oil passage 255 is a linear hole penetrated through a hole portion 259. Also, an inner peripheral surface of the shaft hole 182 is formed with an oil groove 261 along an axis line of the shaft hole 182. The oil groove 261 is formed from a bottom part-side of the shaft hole 182 to an opening of the oil passage 255 and is configured to communicate with the oil passage 255. A stop plug 263 (refer to FIG. 23) for preventing leakage of the lubricating oil is pressed into a part of the bottom part of the shaft hole 182 to which the oil groove 261 is provided.

The lubricating oil supplied through the oil passage 255 shown in FIG. 23 is supplied to the bottom part of the shaft hole 182, through the oil passage formed between the oil groove 261 in the shaft hole 182 and the outer peripheral surface of the outer ring 187 (refer to an arrow D2 in FIG. 23). The lubricating oil reaching the bottom part of the shaft hole 182 is directed towards the radially inner side of the needle bearing 22 through the end face of the outer ring 187 (refer to an arrow D3 in FIG. 23) and passes through an internal space of the needle bearing 22 above the support shaft 31 (refer to an arrow D4 in FIG. 23).

Also at the arm part 173-side, the lubricating oil is supplied along flows corresponding to the flows denoted with the arrows D1 to D4.

Each of the oil passages such as the oil passages 255, 257, the hole portion 259, the oil groove 261 and the like is formed by electric spark machining or mechanical processing. For example, the oil passage 255 and the hole portion 259, and the oil passage 257 and the hole portion 259 are formed from the tip ends-side of the arm parts 173, 175 towards the base end-side of the swinging center. The oil groove 261 is formed from an outer side of the bottom part of the shaft hole 182 towards the opening of the oil passage 255 (which is also the same for the arm part 173-side). Since the hole portions 259, 259 of the tip ends of the arm parts 173, 175, which are opened upon formation of the oil passages 255, 257, are plugged by the outer ring 187 of the needle bearing 22, it is not necessary to incorporate the stop plug therein.

According to the friction roller-type reduction gear 300 of the second configuration example, the supply oil passage of the lubricating oil to be supplied to the intermediate roller 19 is not complicated, and even when the intermediate roller 19 is axially moved, it is possible to supply an appropriate amount of the lubricating oil to an appropriate supply position. Also, an appropriate amount of the lubricating oil is always supplied to the needle bearing 22, so that it is possible to implement the smooth rotation of the intermediate roller 19.

As described above, the present invention is not limited to the above embodiments, and combinations of the respective configurations of the embodiments and changes and modifications made by one skilled in the art on the basis of the specification and the well-known technologies are also intended by the present invention and included within the scope to be protected.

The subject application is based on a Japanese Patent Application No. 2015-69846 filed on Mar. 30, 2015, a Japanese Patent Application No. 2015-81887 filed on Apr. 13, 2015 and a Japanese Patent Application No. 2015-116760 filed on Jun. 9, 2015, which are herein incorporated by reference.

DESCRIPTION OF REFERENCE NUMERALS

11: input shaft
13: output shaft
15: sun roller
15*a*: outer peripheral surface
17: ring roller
17*a*: inner peripheral surface
19: intermediate roller
19*a*: outer peripheral surface (traction surface)
19*b*, 19*b*: end face
19A: roller main body
21: coupling part
22: needle bearing
23: loading cam mechanism
27: stationary ring roller element (stationary roller element)
27*a*: inner peripheral surface (rolling contact surface)
29: moveable ring roller element (moveable roller element)
29*a*: inner peripheral surface (rolling contact surface)
31: support shaft (rotation shaft)
32: swinging holder (holder)
49: cam ring
51: ball (rolling element)
53: first cam grooves
55: second cam grooves
133, 135: facing end face
137, 139: outer end face
179A, 179B: swinging shaft
100, 200, 300: friction roller-type reduction gear

The invention claimed is:

1. A friction roller-type reduction gear comprising:
a sun roller arranged concentrically with an input shaft;
a ring roller arranged concentrically with the sun roller at an outer periphery-side of the sun roller;
a plurality of intermediate rollers supported to be rotatable about a rotation shaft parallel with the input shaft between an outer peripheral surface of the sun roller and an inner peripheral surface of the ring roller and configured to be in rolling contact with the outer peripheral surface of the sun roller and the inner peripheral surface of the ring roller,
a coupling part configured to couple the ring roller and an output shaft, and
a loading cam mechanism configured to change a contact surface pressure of a rolling contact surface of each roller,
wherein the ring roller includes a pair of roller elements provided in parallel in an axial direction of the input shaft,
wherein at least one of the pair of roller elements is a moveable roller element configured to be moveable axially,
wherein the loading cam mechanism is arranged at only an outer end face-side of the moveable roller element in the axial direction and is configured to displace the moveable roller element towards the other roller element in correspondence to rotation torque of the input shaft,
wherein the outer peripheral surface of the sun roller is a concave curved surface of which a shape of an outer edge in an axial cross-section is a single circular arc-shaped concave curve, and
wherein an outer peripheral surface of the intermediate roller is a convex curved surface of which a shape of an outer edge in an axial cross-section is a single circular arc-shaped convex curve.

2. The friction roller-type reduction gear of according to claim 1,
wherein the loading cam mechanism comprises:
first cam grooves provided at a plurality of places along a circumferential direction of an outer end face of the moveable roller element;
a cam ring provided with second cam grooves arranged to face the outer end face of the moveable roller element and provided at a plurality of places corresponding to the first cam grooves; and
a plurality of rolling elements interposed between the first cam grooves and the second cam grooves, and
wherein each of the first cam grooves and the second cam grooves has a shape in which a depth in the axial direction gradually changes along the circumferential direction and becomes shallower towards a circumferential end portion of the cam groove.

3. The friction roller-type reduction gear according to claim 2,
wherein one roller of the intermediate rollers, the sun roller and the ring roller is supported to be rotatable axially and not to be displaceable axially, and
wherein rollers except for the one roller are supported to be rotatable axially and to be displaceable axially.

4. The friction roller-type reduction gear according to claim 1,
wherein one roller of the intermediate rollers, the sun roller and the ring roller is supported to be rotatable axially and not to be displaceable axially, and
wherein rollers except for the one roller are supported to be rotatable axially and to be displaceable axially.

5. The friction roller-type reduction gear according to claim 4 further comprising a holder provided for each of the intermediate rollers and configured to support the rotation shaft,
wherein the rotation shaft is provided to extend from both end portions of a roller main body of the intermediate roller, the roller main body provided at an outer peripheral surface with a traction surface in rolling contact with the outer peripheral surface of the sun roller and the inner peripheral surface of the ring roller, and
wherein the holder has a gap, in which the intermediate roller is movable in the axial direction, between an inner surface of the holder and an end face of the roller main body, and is configured to support the rotation shaft to be rotatable and to be moveable axially via a needle bearing.

* * * * *